(12) United States Patent
Kunc et al.

(10) Patent No.: US 11,267,201 B2
(45) Date of Patent: Mar. 8, 2022

(54) INCREASED MATERIAL FLOW THROUGHPUT IN LARGE SCALE ADDITIVE MANUFACTURING THROUGH MOVABLE SEGMENTED BUILD PLATFORM

(71) Applicants: UT-BATTELLE, LLC, Oak Ridge, TN (US); Magnum Venus Products, Inc., Knoxville, TN (US)

(72) Inventors: Vlastimil Kunc, Knoxville, TN (US); Ahmed A. Hassen, Knoxville, TN (US); Brian K. Post, Knoxville, TN (US); David W. Nuttall, Knoxville, TN (US); John M. Lindahl, Powell, TN (US); Lonnie J. Love, Knoxville, TN (US); Tim Deluca, Lake Tapps, WA (US); Mike Walch, Port Orchard, WA (US); Benjamin J. Hedger, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 245 days.

(21) Appl. No.: 16/816,982

(22) Filed: Mar. 12, 2020

(65) Prior Publication Data
US 2020/0290276 A1 Sep. 17, 2020

Related U.S. Application Data

(60) Provisional application No. 62/816,937, filed on Mar. 12, 2019.

(51) Int. Cl.
*B29C 64/245* (2017.01)
*B33Y 50/02* (2015.01)
(Continued)

(52) U.S. Cl.
CPC .......... *B29C 64/245* (2017.08); *B29C 64/379* (2017.08); *B29C 64/393* (2017.08); *B33Y 10/00* (2014.12); *B33Y 30/00* (2014.12); *B33Y 40/20* (2020.01); *B33Y 50/02* (2014.12); *B29K 2101/10* (2013.01); *B33Y 70/00* (2014.12)

(58) Field of Classification Search
CPC ... B29C 64/245; B29C 64/379; B29C 64/393; B29C 64/118; B33Y 10/00; B33Y 30/00; B33Y 40/20; B33Y 50/02; B33Y 70/00; B29K 2101/10
See application file for complete search history.

(56) References Cited

U.S. PATENT DOCUMENTS

| | | | | |
|---|---|---|---|---|
| 9,517,591 B2 * | 12/2016 | Yoo | ................. | B29C 64/176 |
| 2016/0231648 A1 * | 8/2016 | Hirano | ............... | B29C 64/20 |
| 2021/0170484 A1 * | 6/2021 | Buhr | ................ | B29C 64/393 |

* cited by examiner

*Primary Examiner* — Nahida Sultana
(74) *Attorney, Agent, or Firm* — Fox Rothschild LLP

(57) ABSTRACT

An assembly for additive manufacturing includes a build housing including a base, a print head, and a print head support connected to the base for supporting the print head above the base. A driver system is provided for moving the print head and the base relative to one another. A build platform comprising a build support and at least one platen. The build support can be detachably engageable to the housing. The platens can be detachably engageable to the build support. The build support can include registration structure for registering the position of the build support relative to the build housing. A method of additive manufacturing is also disclosed.

30 Claims, 29 Drawing Sheets

(51) Int. Cl.
*B29C 64/393* (2017.01)
*B33Y 30/00* (2015.01)
*B33Y 40/20* (2020.01)
*B29C 64/379* (2017.01)
*B33Y 10/00* (2015.01)
*B33Y 70/00* (2020.01)
*B29K 101/10* (2006.01)

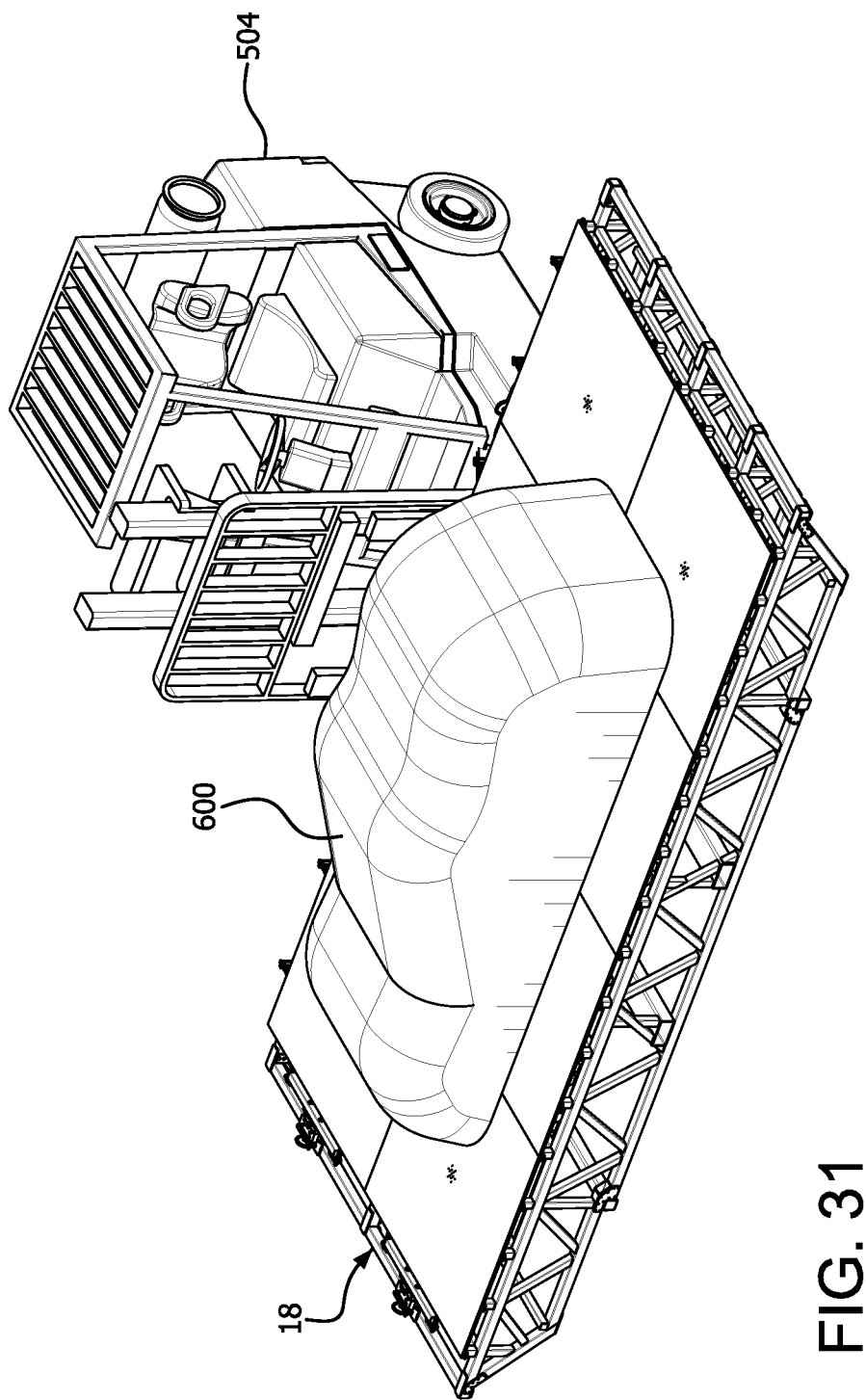

INCREASED MATERIAL FLOW THROUGHPUT IN LARGE SCALE ADDITIVE MANUFACTURING THROUGH MOVABLE SEGMENTED BUILD PLATFORM

CROSS-REFERENCE TO RELATED APPLICATIONS

This application claims priority to U.S. Provisional Patent Application No. 62/816,937 filed on Mar. 12, 2019, entitled "Increased Material Flow Throughput in Large Scale Additive Manufacturing Through Movable Segmented Build Platform", the entire disclosure of which is incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention relates additive manufacturing, and more particularly to systems and methods for the additive manufacturing of large build items.

BACKGROUND OF THE INVENTION

Large scale additive manufacturing requires significant capital investment. This investment is frequently idle due to pre- and post-processing operations that must occur in existing printers. Examples of these operations include securing the build sheet to the build plate before printing, or letting deposited material cool and/or cure after a print is complete. Moreover, there are additional non-productive steps associated with producing fully finished additively manufactured parts such as laser alignment of a part for machining, or removal and transport of partially finished components to secondary post-treatment operations.

SUMMARY OF THE INVENTION

An assembly for additive manufacturing can include a build housing comprising a base, a print head, and a print head support connected to the base for supporting the print head above the base. A driver system can be provided for moving the print head and the base relative to one another. A build platform can include a build support and at least one platen. The build support can be detachably engageable to the housing. The build support can include registration structure for registering the position of the build support relative to the build housing. The print head support can be a gantry.

A plurality of platens can be positioned on the build support. The platen can be detachably engageable to the build support. The build housing can further include a plurality of vacuum ports communicating with a vacuum supply conduit. The platens can have vacuum passages. The vacuum passage of a platen can align with one of the vacuum ports to supply vacuum to a build item on the platen. At least one valve can be provided for controlling vacuum to at least one vacuum port.

The build support can include alignment structure for positioning the platens. The alignment structure can include locating pins. The build support can include at least one clamp assembly comprising a movable jaw for engaging the platens.

The build housing can further include a conveyor for moving the build support into and out of the build housing. The conveyor can include rollers. The conveyor can be movable relative to the base.

The driver system can include a lifting member for engaging and lifting the build support, and a motor for moving the lifting member. The lifting member can include lifting frame on opposing sides of the housing. Each lifting frame can include a lifting surface for engaging a cooperating surface on the build support such that lifting or lowering of the lifting frame will respectively lift and lower the build support. A motor can be provided for lifting and lowering each lifting frame. The operation of each motor can be controlled by a processor. The registration structure can include cooperating registration projections and apertures on the build support and the lifting members.

The build support comprises a transport connector for connecting a transport device to the build support. The transport connector can include structure for engaging the fork of a fork lift, or for engaging a pallet stacker or robot. The structure for engaging the fork of a fork lift can include open-ended elongated parallel enclosures attached to the build support and dimensioned to receive the forks of the forklift.

The additive manufacturing assembly can include at least one processor for controlling the operation of the print head and the driver system, tracking of a build platform, and tracking of a build item. The additive manufacturing assembly can include sensors on at least one selected from the group consisting of the build housing, the build support, and the platens for data acquisition and location tracking.

A method of additive manufacturing can include the step of providing a build housing comprising a base, a print head, and a print head support connected to the base for supporting the print head above the base, and a driver system for moving the print head and the base relative to one another. A build platform can include a build support and at least one platen, the build support being detachably engageable to the base of the build housing. The build support and at least one platen are positioned into the build housing. The position of the build support relative to the housing are registered. The print head and the driver system are operated to print a build item. The build support is disengaged and the build support and the build item are removed from the housing. The additive manufacturing can be with a thermoset resin.

The platen can be detachably engageable to the build support, and the method can further include the step of placing and aligning the platen on the build support. The method can further include the step of allowing the build item to cool after removal of the build support and the build item from the build housing. After removing the build support and the build item from the build housing, the build support and the build item can be placed in a computer numerical control (CNC) machine, and the position of the build support and the build item is registered in the CNC machine. The CNC can be at least one selected from the group consisting of a milling machine, a lathe, a router, a grinder, a laser cutter, a water jet cutter, a stamping machine, or a robotic machine.

The driver system can include a lifting member for engaging and lifting the build support, and a motor for moving the lifting member, and the method can further include the step of operating the driver system to lift and lower the build support relative to the print head. The registration step can include engaging cooperating registration projections and apertures on the build housing and the build support. The method can also include the step of providing sensors on at least one selected from the group consisting of the build housing, the build support, and the platens and using the sensors for data acquisition and location tracking.

BRIEF DESCRIPTION OF THE DRAWINGS

There are shown in the drawings embodiments that are presently preferred it being understood that the invention is not limited to the arrangements and instrumentalities shown, wherein:

FIG. 31 is a perspective view of a build platform with a build piece and a transport device after treatment in the CNC machine.

DETAILED DESCRIPTION OF THE INVENTION

Figure 1:
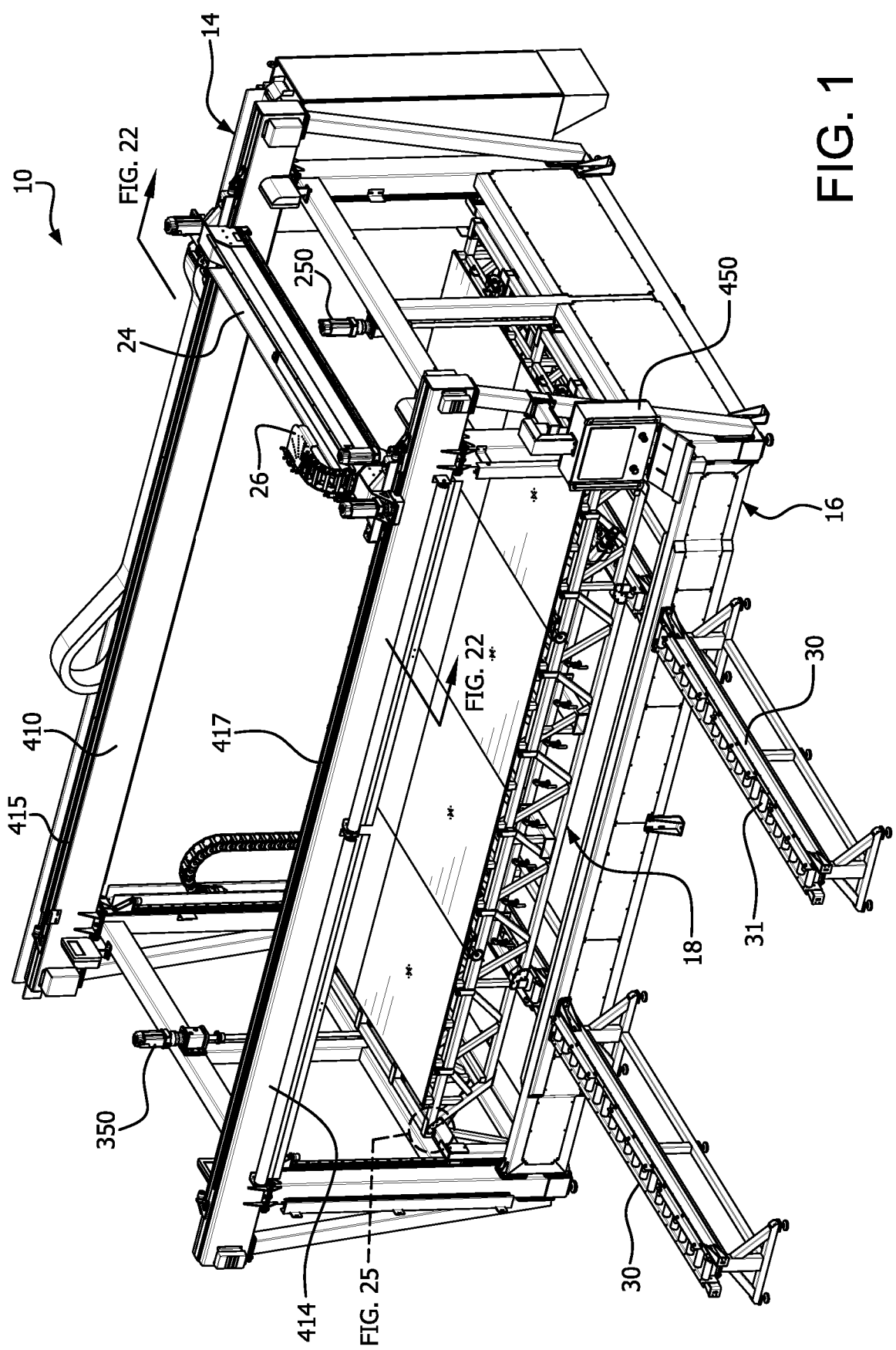
FIG. 1 is a perspective view of an assembly for additive manufacturing according to the invention.
Figure 2:
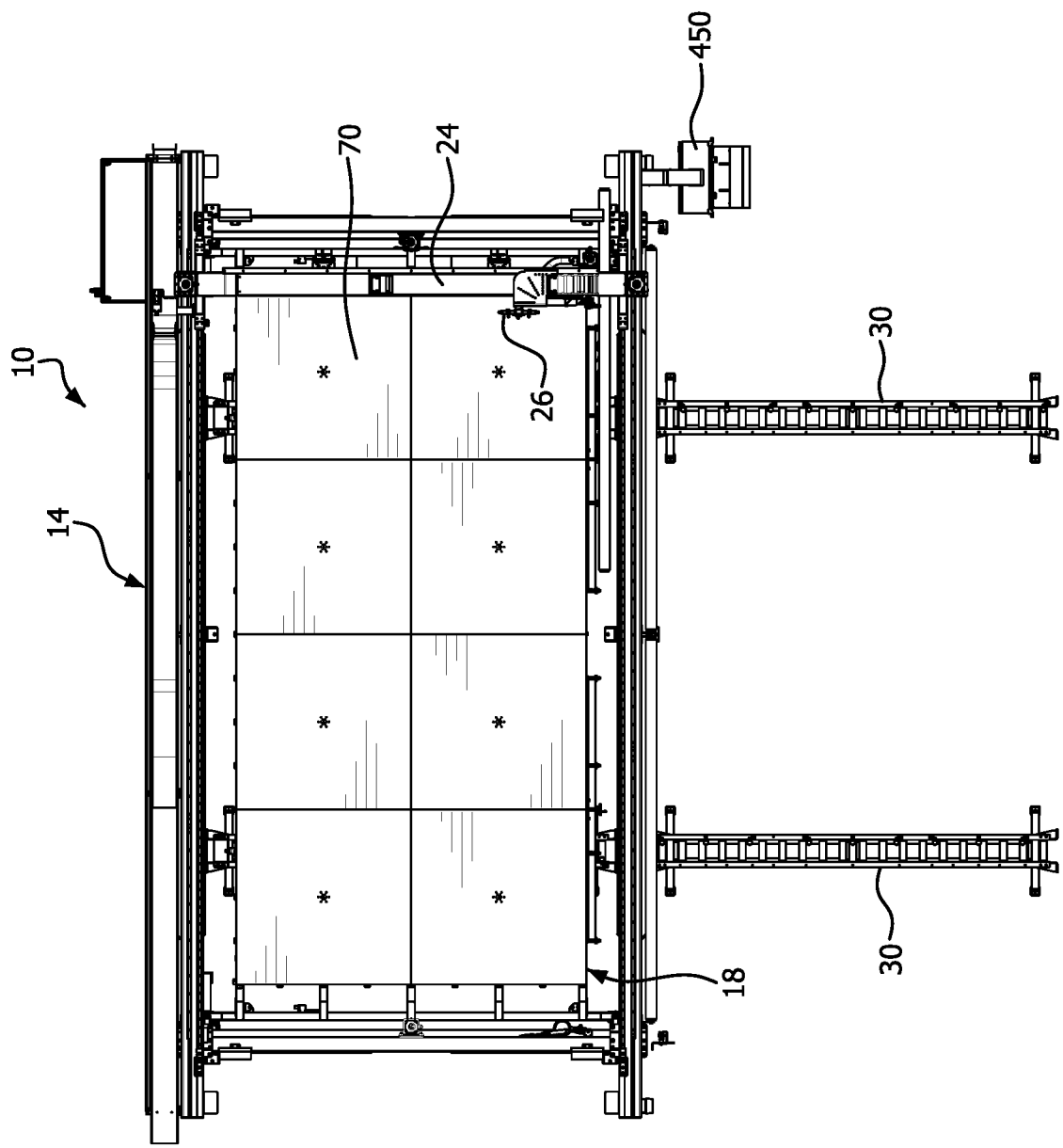
FIG. 2 is a plan view.
Figure 3:
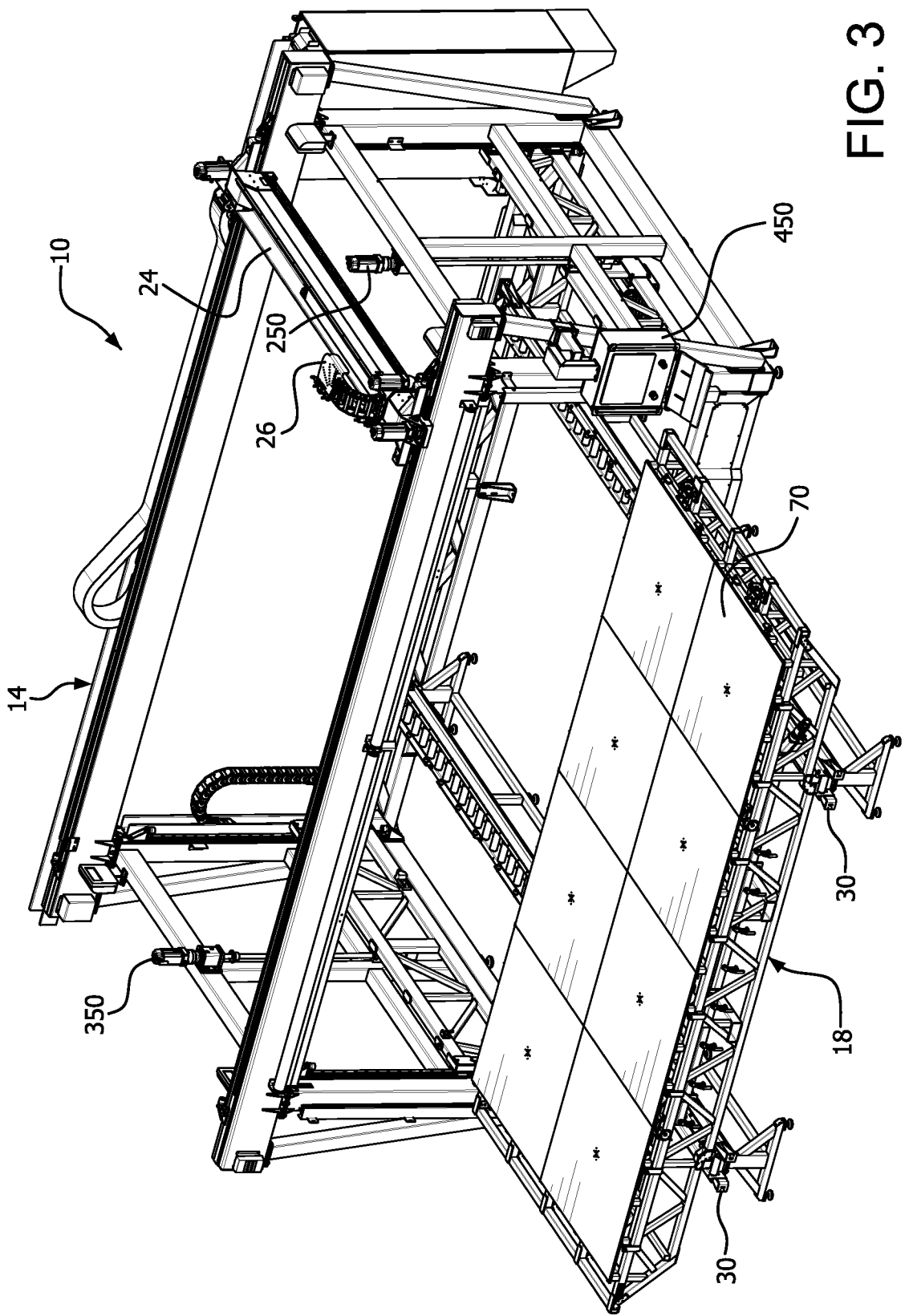
FIG. 3 is a perspective view in an alternative mode of operation.

An assembly for additive manufacturing comprises a build housing comprising a base, a print head, and a gantry assembly connected to the base for supporting the print head above the base. The design and construction of the base, print head and gantry assembly can vary. Many different designs and constructions are known and are possible.

A driver system is provided for moving the print head and the base relative to one another. In many designs the print head is stationary or moves only for minor adjustments, and the base or support is lifted or lowered relative to the print head moved during normal printing operations. In other designs the print head or gantry supporting the print head are moved to lift or lower the print head.

A build platform comprising a build support and at least one platen is provided. The build support according to the invention can be detachably engageable to the housing. The build support can include registration structure for registering the position of the build support relative to the build housing. The registration structure can be cooperating registration projections and apertures on the build support and the lifting frame. Other registration structure is possible such as bolts, clamps, and others.

The platen provides a flat surface on which the build item is printed, and is usually removable from the build support so the that build item can also be readily removed from the housing and from the build support when desired. A new platen or platens can then be replaced onto the build support to allow a new build item to be printed. The platen can have varying dimensions and can be made from varying materials. A single large platen can be utilized or several small platens can be juxtaposed to provide a surface on which the build item can be printed. The build support can have alignment structure for positioning the platens. Different kinds of alignment structure are possible. The alignment structure in one embodiment can include locating pins which can serve to engage side edges of the platens to position them in a proper alignment with the build support. It is also possible to include a build sheet which would rest on the platens. The build sheet allows the platens to be re used without extensive cleaning or interruption. The build item can be printed directly on a platen or platens, or on a build sheet resting on the platens. The build sheet or platens can also be formed integrally with or permanently affixed to the build support. The build sheets can also be replaced with molds, cores or forms.

The build support can include a plurality of vacuum ports communicating with a vacuum supply conduit. The vacuum is used to retain the build item in position while it is being printed, or to retain the build sheet in position. The platens can include vacuum passages. The vacuum passages of a platen can align with one of the vacuum ports to supply vacuum to a build item or a build sheet on the platens. At least one valve can be provided for controlling vacuum to at least one vacuum port.

The build support can include additional or alternative structure for positioning and securing the platens. The build support can include at least one clamp assembly comprising a movable jaw for engaging the platens. Adjusting structure such as threaded rods can be used to position the jaws, and thereby the platens, in a desired position and retain them there. Pins or other suitable abutment structure can be provided to engage and position the platens under the force of the jaws.

The additive manufacturing assembly can include structure for facilitating the placement and removal of the build platform into and out of the housing. The build housing can include a conveyor for moving the build support into and out of the build housing. Many different conveyor structures are known and are possible. The conveyor can for example comprise rollers. The conveyor can be movable relative to the base. For example the conveyor can be mounted to the base such that it can slide into or under the base when desirable so as not to unnecessarily take up space. It is also possible to disconnect the base and move the base to another location when it is not in use.

The driver system can have varying constructions. In one such construction, the driver system comprises a lifting member for engaging and lifting the build support, and a motor for moving the lifting member. The lifting member comprises a lifting frame on opposing sides of the housing. Each lifting frame can include a lifting surface for engaging a cooperating surface on the build support such that lifting or lowering of the lifting frame will respectively lift and lower the build support. A motor can be provided for lifting and lowering each lifting frame.

The build support can also include a transport connector for connecting a transport device to the build support. The transport connector comprises structure for engaging the fork of a fork lift. The structure for engaging the fork of a fork lift comprises open-ended elongated parallel transport enclosures attached to the build support and dimensioned to receive the forks of the forklift. Other transport devices, for example robotic transport devices, and structure for engaging with the transport device is possible. The build support can have sensors and structure to support automated workflow and the internet of things (IOT).

The additive manufacturing assembly can include at least one processor for controlling the operation of the print head and the driver system. Processors for controlling additive manufacturing are well known, and any suitable such processor can be utilized. The operation of the motors and/or the vacuum pump can be controlled by the processor, in addition to control of the print head and gantry. The processor can also be used to track the location of the build platform, and possible also of transport devices moving the build platform.

A method of additive manufacturing according to the invention includes the steps of providing a build housing comprising a base, a print head, and a gantry assembly connected to the base for supporting the print head above the base, and a driver system for moving the print head and the base relative to one another. A build platform includes a build support and at least one platen. The build support is detachably engageable to the base of the build housing. The build support and at least one platen are placed into and positioned in the build housing. The position of the build support relative to the housing is registered. The print head and the gantry are operated to print a build item. The build support is disengaged and removed with the build item from the housing. The platen can be detachably engageable to the build support, and the method can further include the step of placing and aligning the platen on the build support.

The method can include the step of allowing the build item to cool and/or cure after removal of the build support and the build item from the build housing. The method can include the step of, after removing the build support and the build item from the build housing, placing the build support and the build item in a computer numerical control (CNC) machine or other post-printing operation. The position of the build support and the build item can be quickly registered in the CNC machine using the same alignment structure used to align and register the build support with the build housing. The CNC machine comprises at least one selected from the group consisting of a milling machine, a lathe, a router, a grinder, a laser cutter, a water jet cutter, a stamping machine, or a robotic machine. Other post-printing machines are possible such as spray coating, filament winding and other continuous fiber machines such as tape layup and automated fiber placement (AFP), plating of plastics (POP), and dip coating.

The additive manufacturing system and method can be used to print a variety of different materials, including polymers, metals and ceramics. The invention can be used to print with thermoset resins. These resins require a significant cooling and or curing time before any subsequent operations such as CNC milling are possible. The invention permits the removal of the build item and build support from the build housing to allow curing or cooling outside of the build housing, such that the build housing can be used to print another build item.

Individual platens can also contain alignment features to allow for fast object location in 3D space when not removing the entire build support. Sensors can be implemented within individual platens to collect and retain initial data such as date of production, cad models, material used, cure cycle, temperature, vibrations, and the like.

Figure 4:
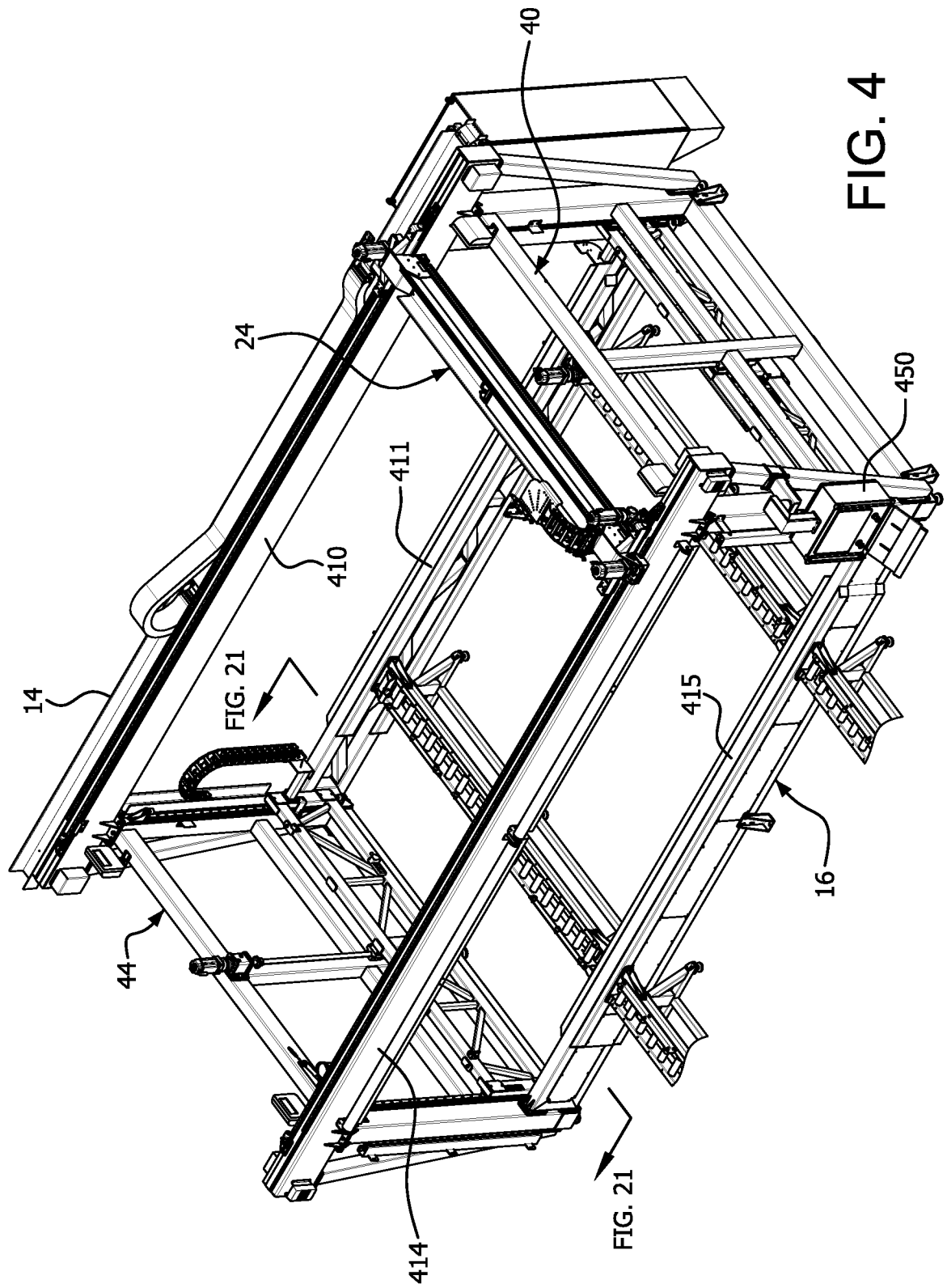
FIG. 4 is a perspective view of a build housing, partially broken away.

There is shown in FIGS. 1-26 an assembly for additive manufacturing 10. The assembly 10 includes a build housing 14 having a base 16 and a build platform 18. A gantry 24 supports a print head 26 above the build platform 18. The build platform 18 is removable from the build housing 14 and suitable structures such as conveyors 30 with rollers 31 can assist in moving the build platform 18 into and out of the build housing 14. The build housing 14 can include a base 16 and right side end 40 and left side end 44 for supporting the gantry 24 and a driver system for moving the build platform 18 relative to the gantry 24 and print head 26 (FIG. 4).

Figure 5:
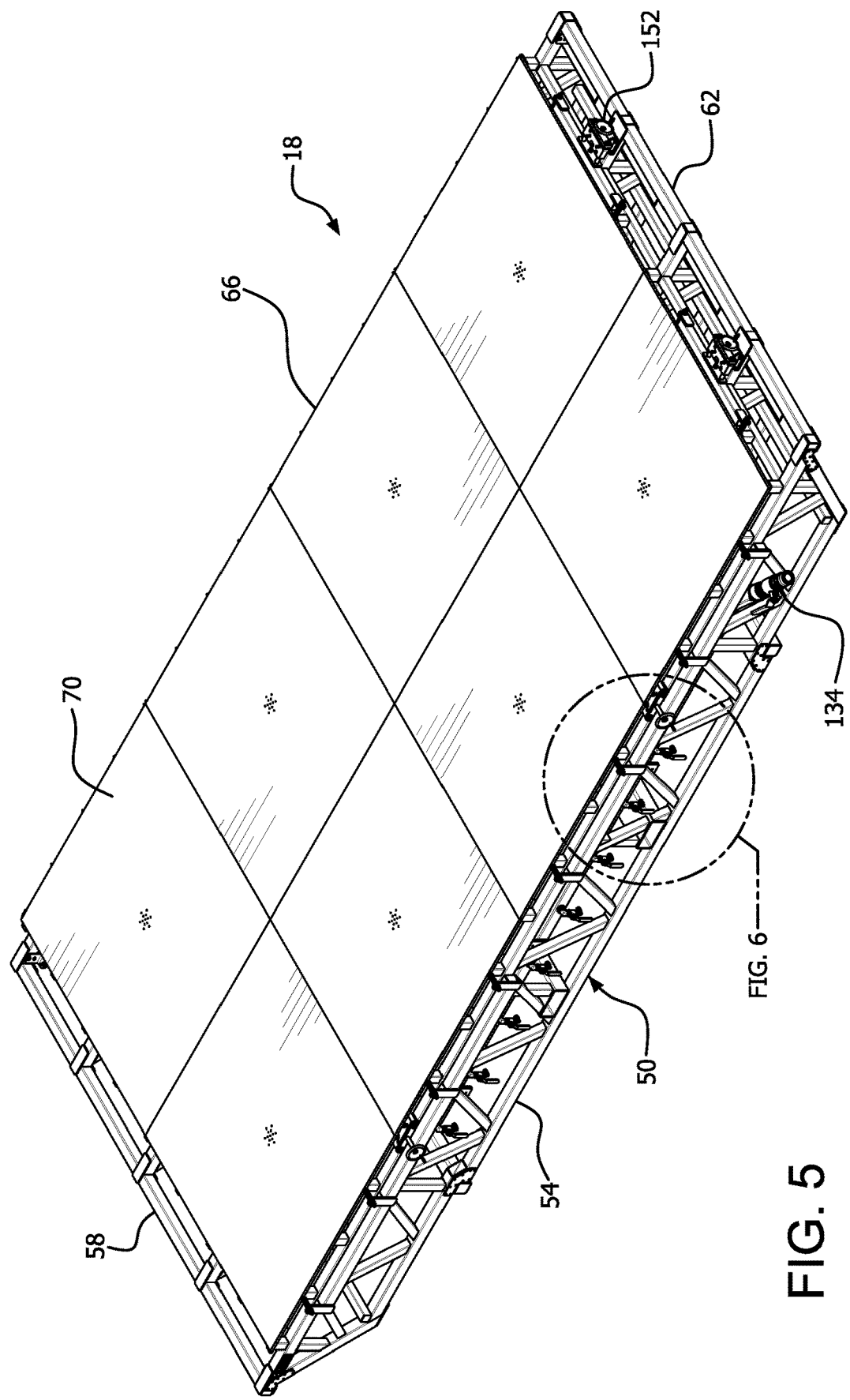
FIG. 5 is a front perspective view of a build platform.
Figure 6:
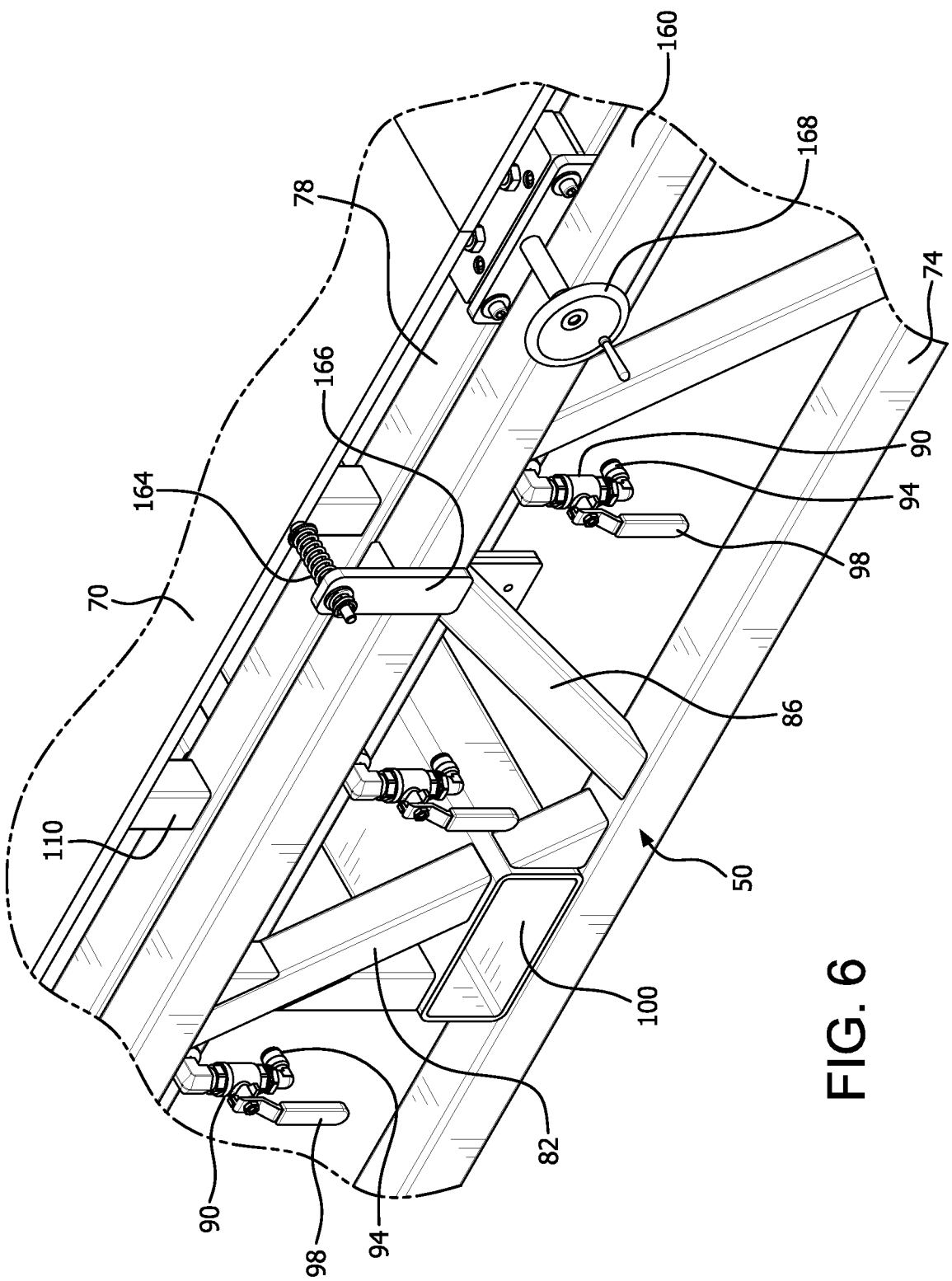
FIG. 6 is a magnified view of area FIG. 6 in FIG. 5.
Figure 7:
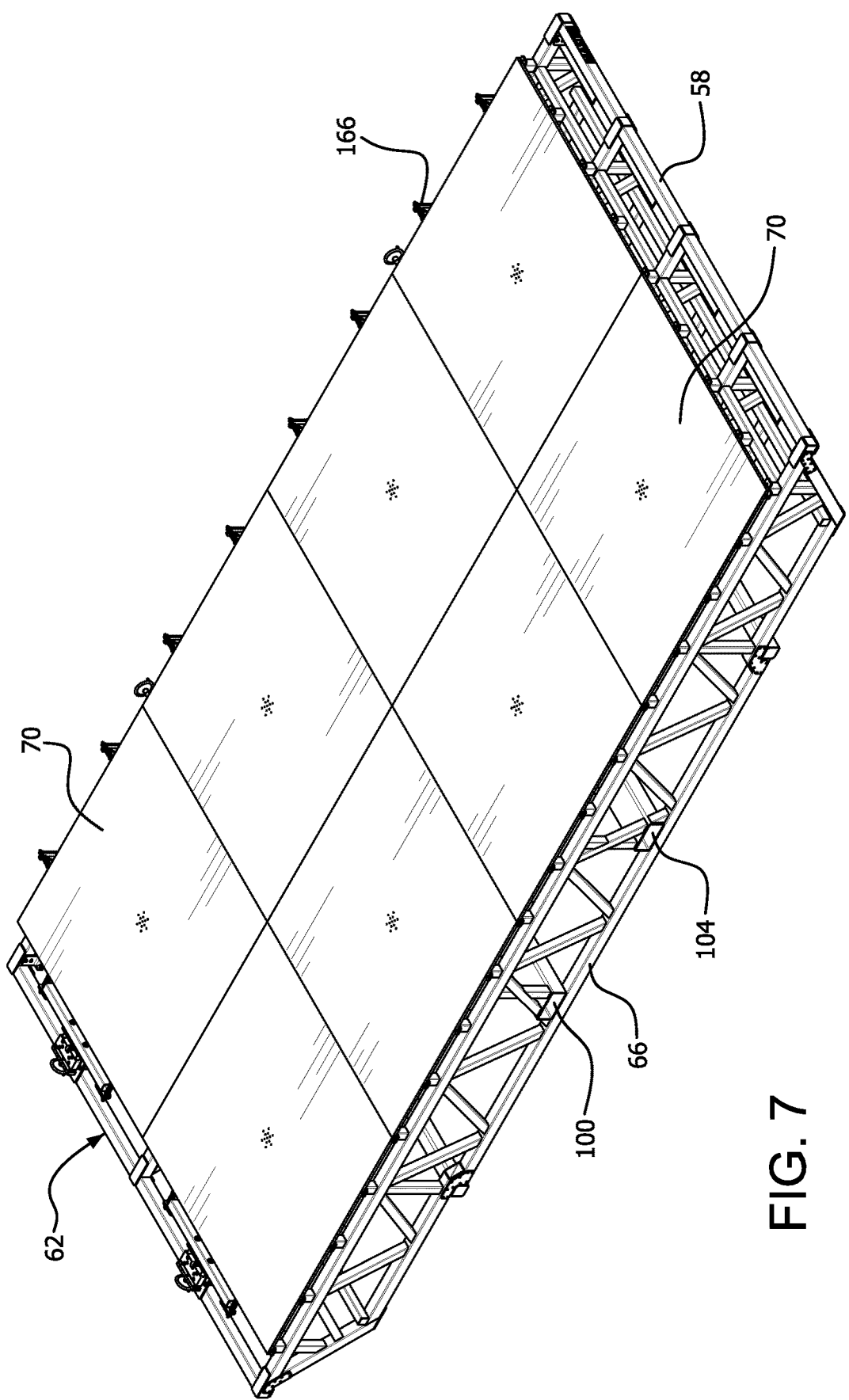
FIG. 7 is a rear perspective view of a build platform.
Figure 8:
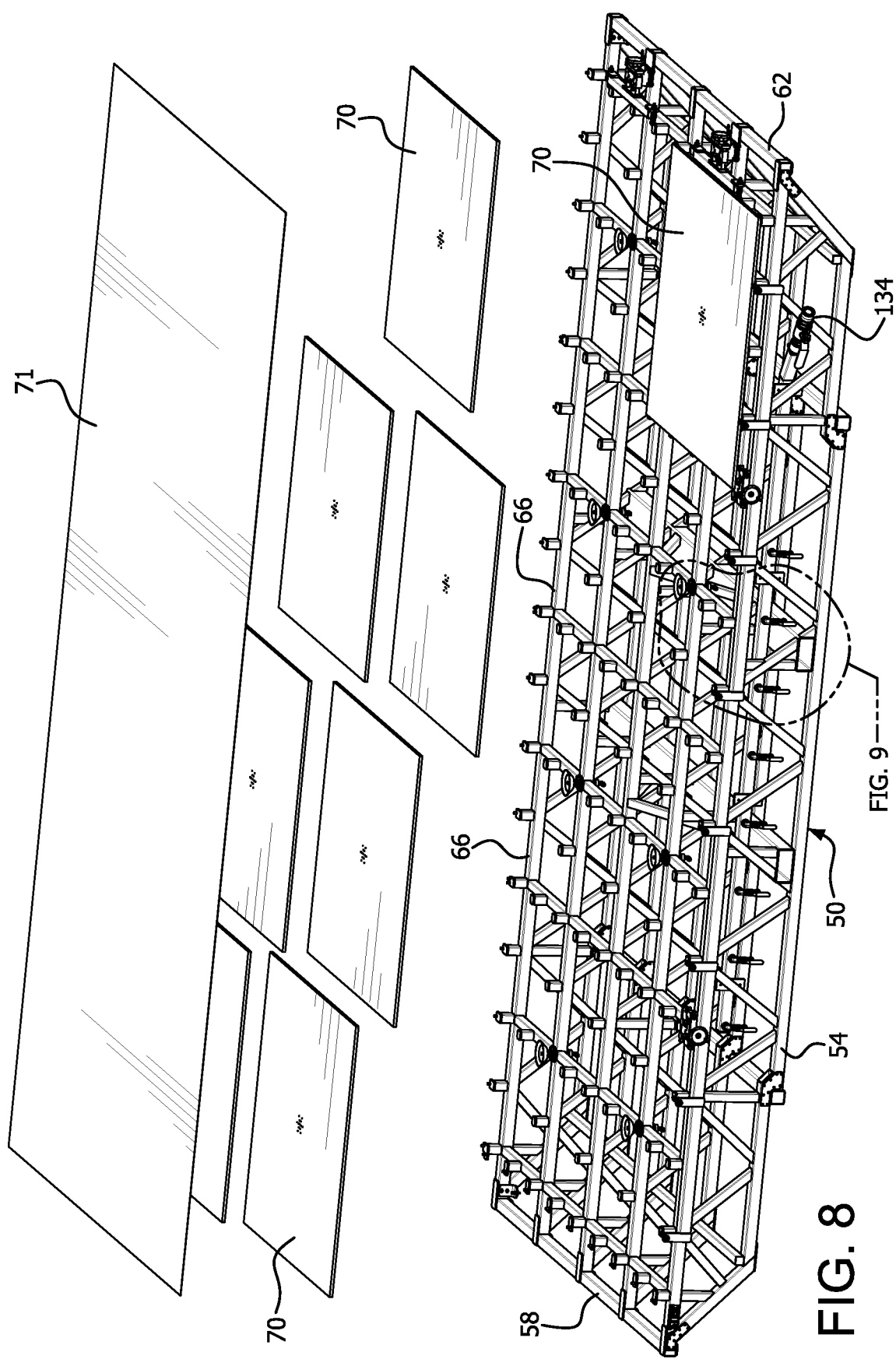
FIG. 8 is an exploded perspective view of a build platform with a build sheet.
Figure 15:
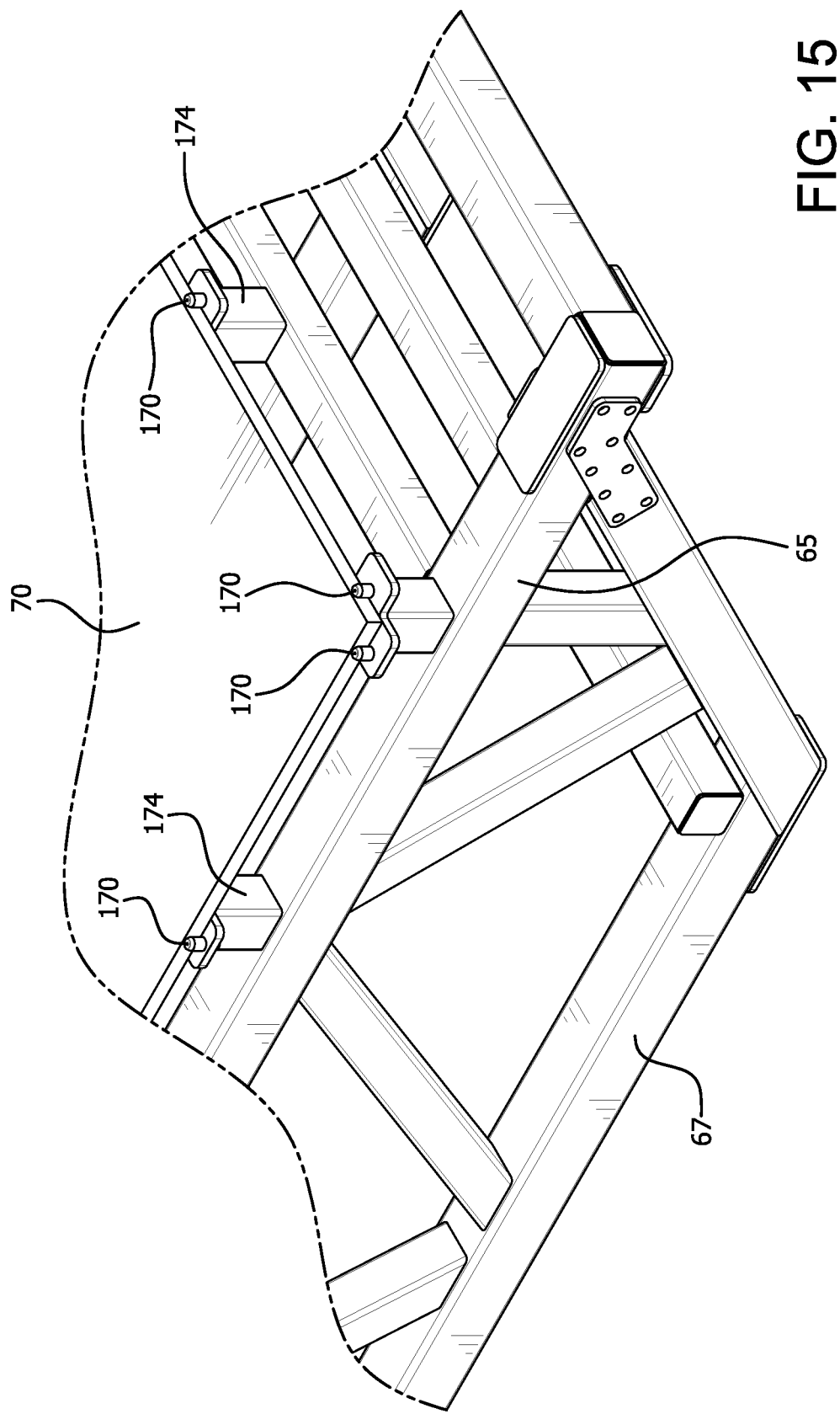
FIG. 15 is a perspective view of the build platform of FIG. 11 from the perspective of line FIG. 15-FIG. 15 in FIG. 11.
Figure 16:
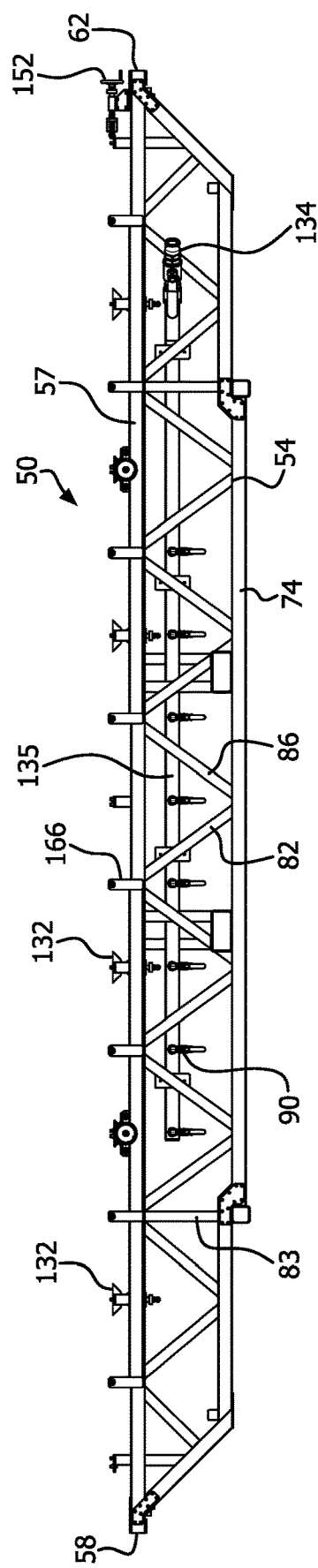
FIG. 16 is a front elevation of a build support.
Figure 17:
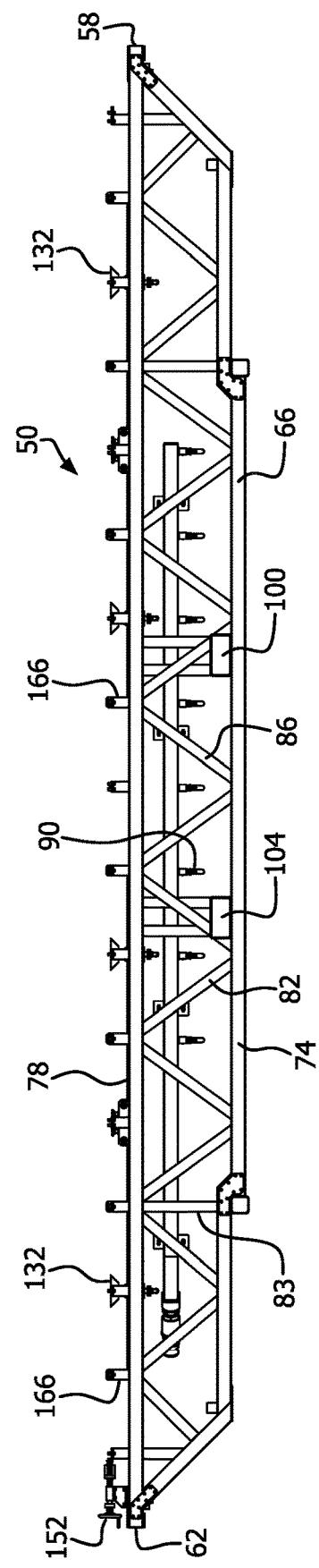
FIG. 17 is a rear elevation of a build support.
Figure 18:
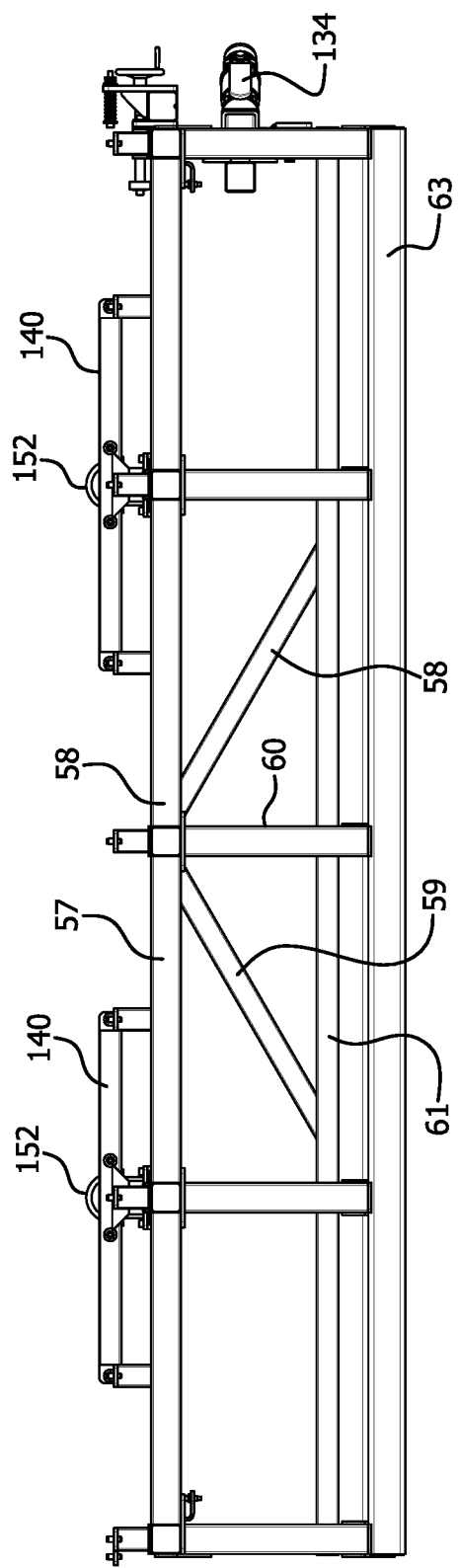
FIG. 18 is a left side elevation of a build support.
Figure 19:
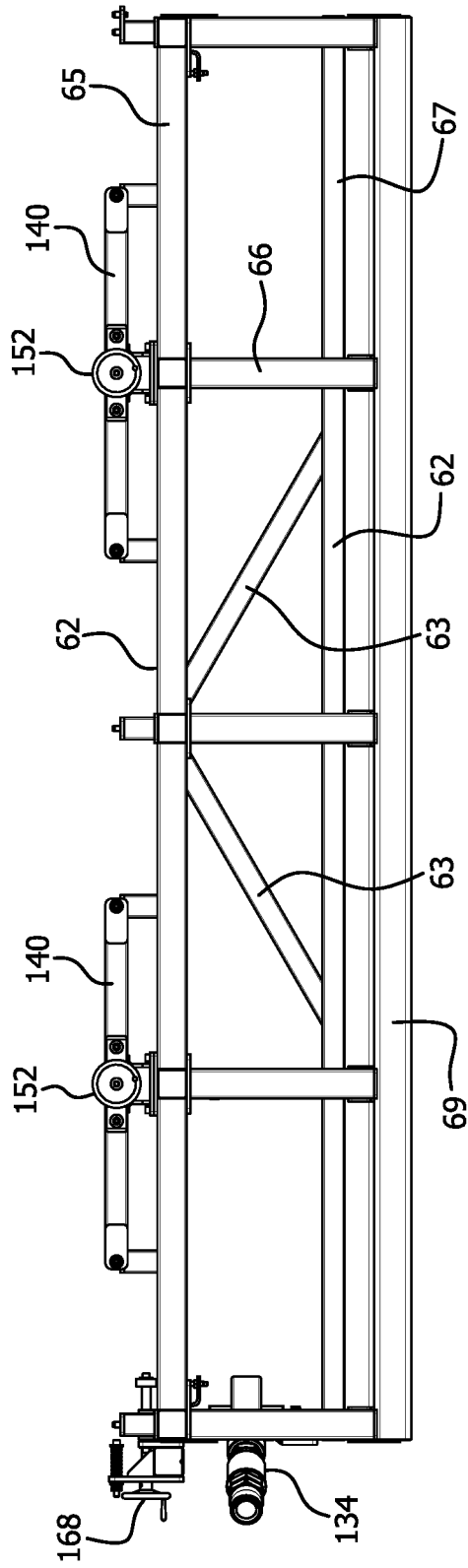
FIG. 19 is a right side elevation of a build support.

The build platform 18 is shown in FIGS. 5-19. The build platform 18 includes a build support 50 having a front 54, left side 58, right side 62, and rear 66. Platens 70 can rest on the build support 50 (FIG. 5). The build support 50 can include at the front side 54 a lower structural member 55 and an upper structural member 57 (FIG. 16). The build support 50 can include at a rear side 66 a lower structural member 74 and an upper structural member 78. A plurality of vertical supports 83 and struts 82 and 86 can be utilized to strengthen the build support 50 as necessary (FIG. 17). A left side can 58 comprise upper rail 57, lower rail 61, support struts 59, vertical supports 60, and base rail 63 (FIG. 18). A right side 62 can include upper rail 65, lower rail 67, support struts 63, vertical support 66, and base rail 69 (FIG. 19). Angled struts 76 (FIG. 14) extend the upper portions of the left side 58 and right side 62 laterally such that lifting structure of the build housing 14 can engage the undersides to lift the build support 50.

Figure 9:
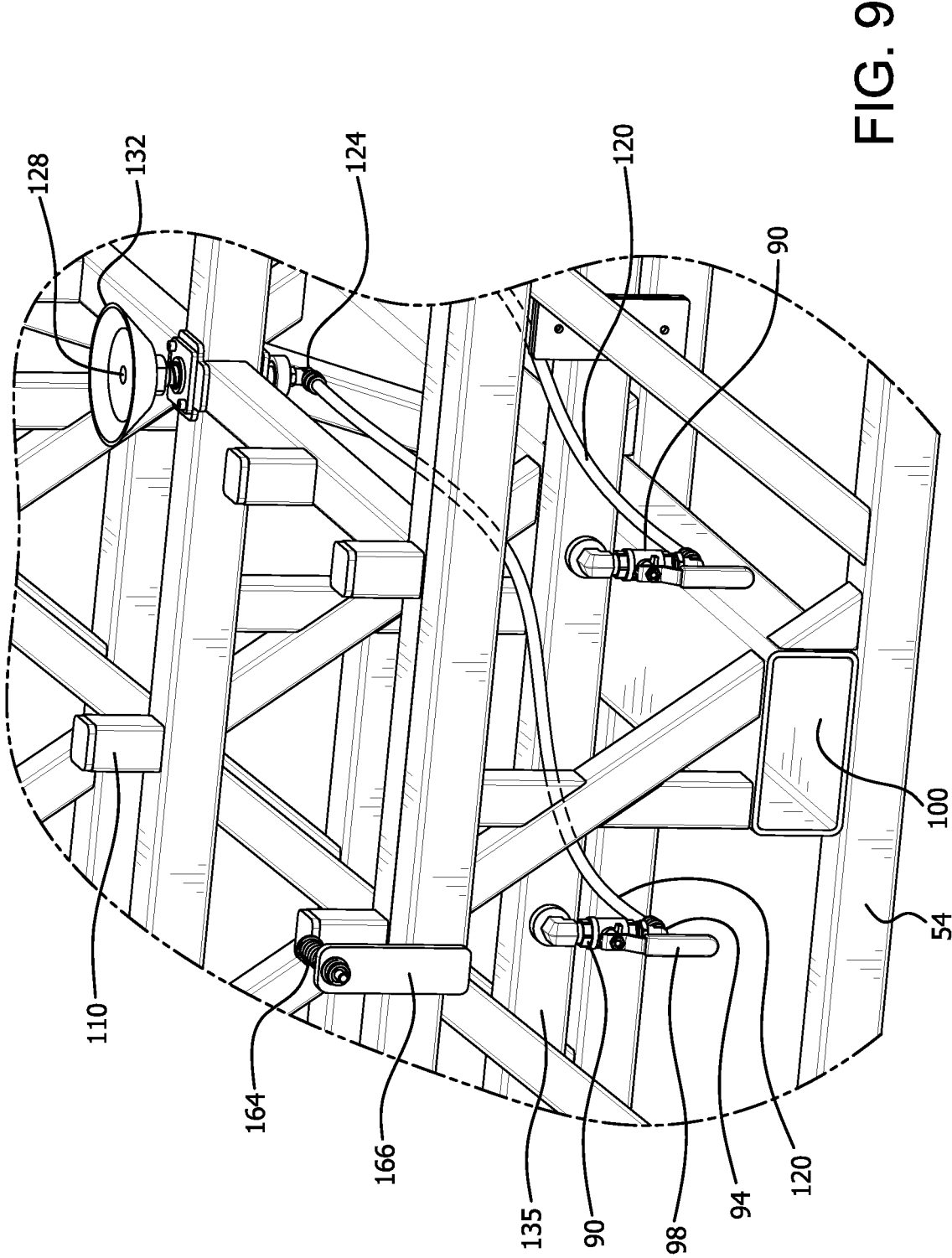
FIG. 9 is a magnified view of area FIG. 9 in FIG. 8.
Figure 10:
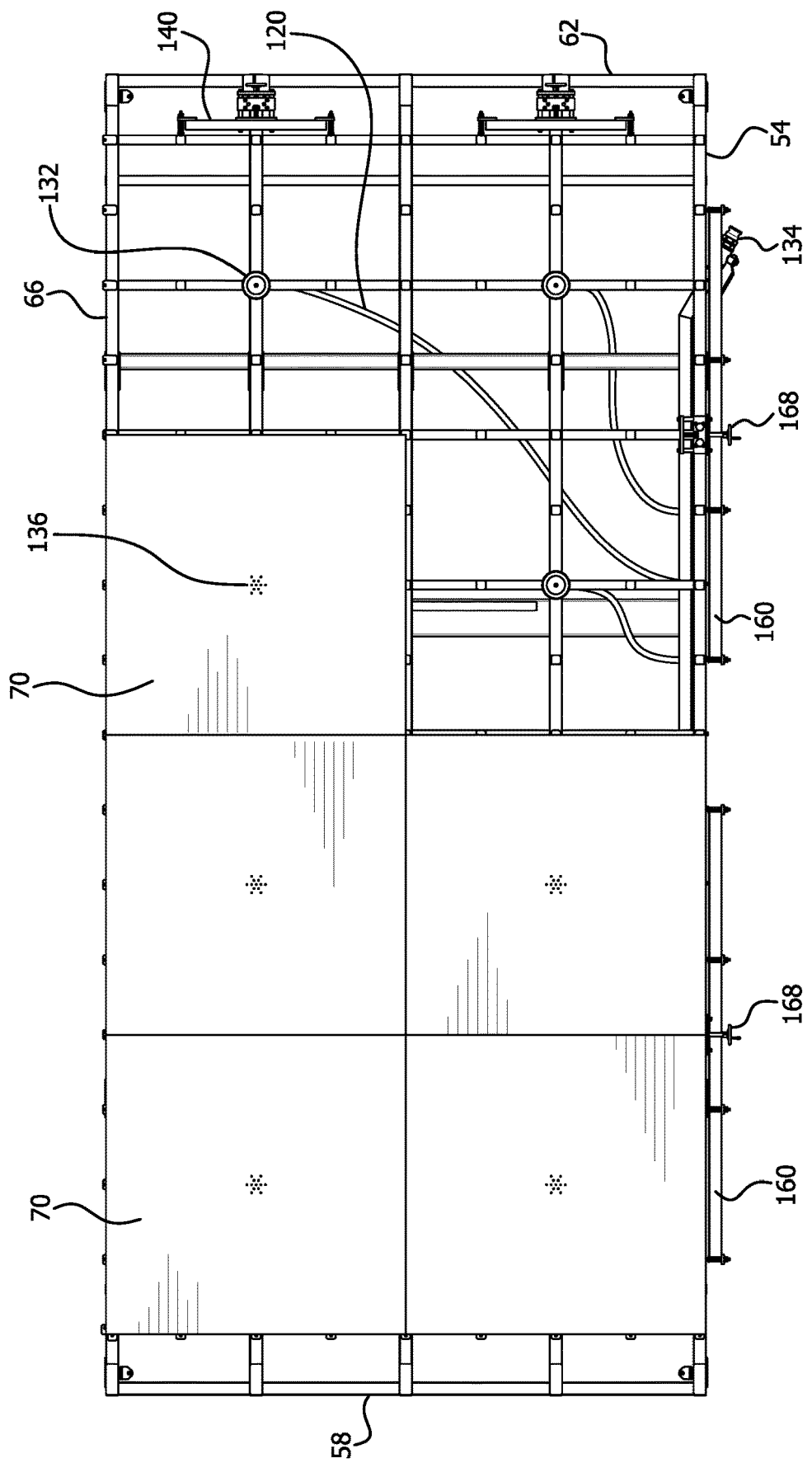
FIG. 10 is a plan view of a build platform with some platens removed.
Figure 13:
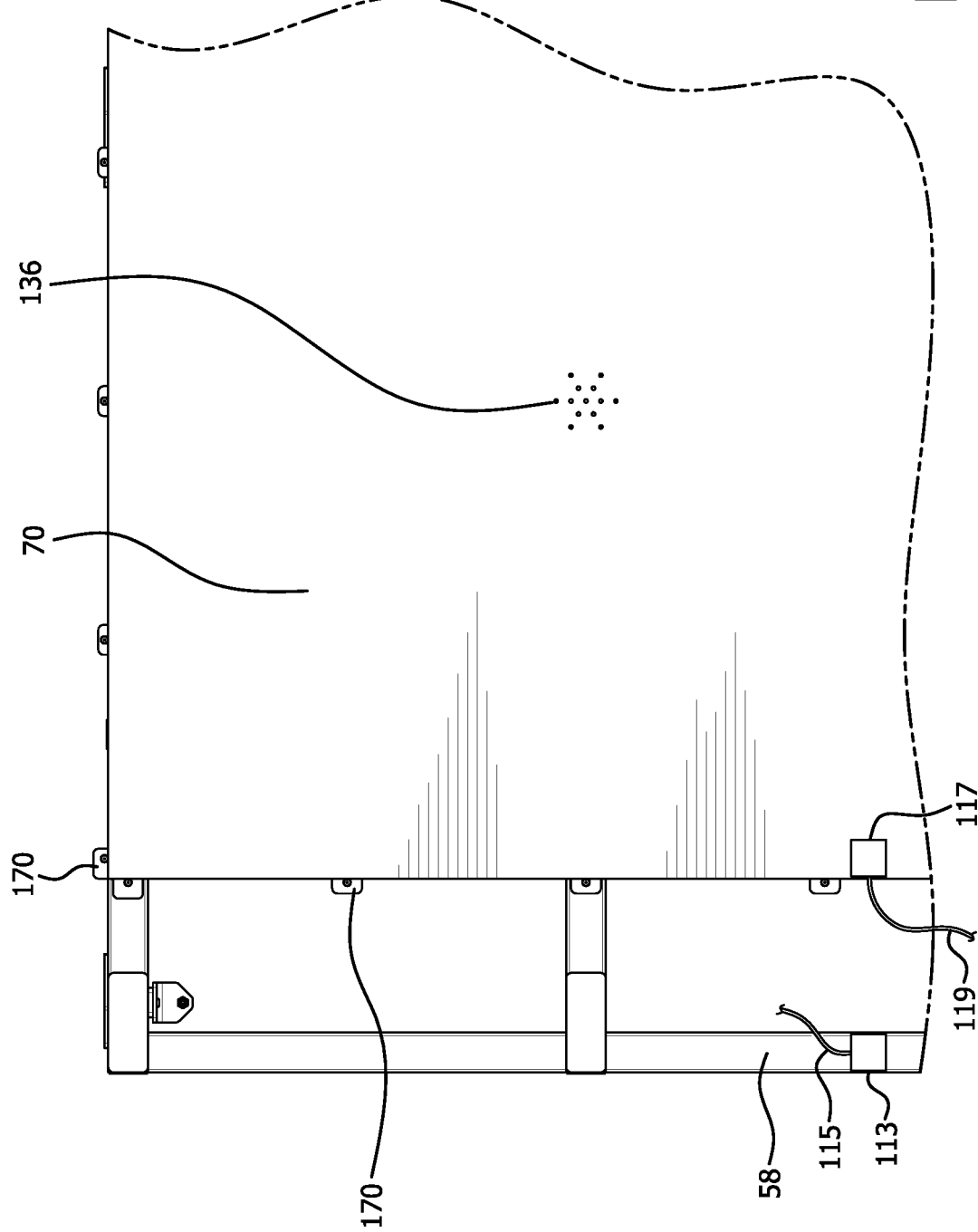
FIG. 13 is a magnified view of area FIG. 13 in FIG. 11.
Figure 20:
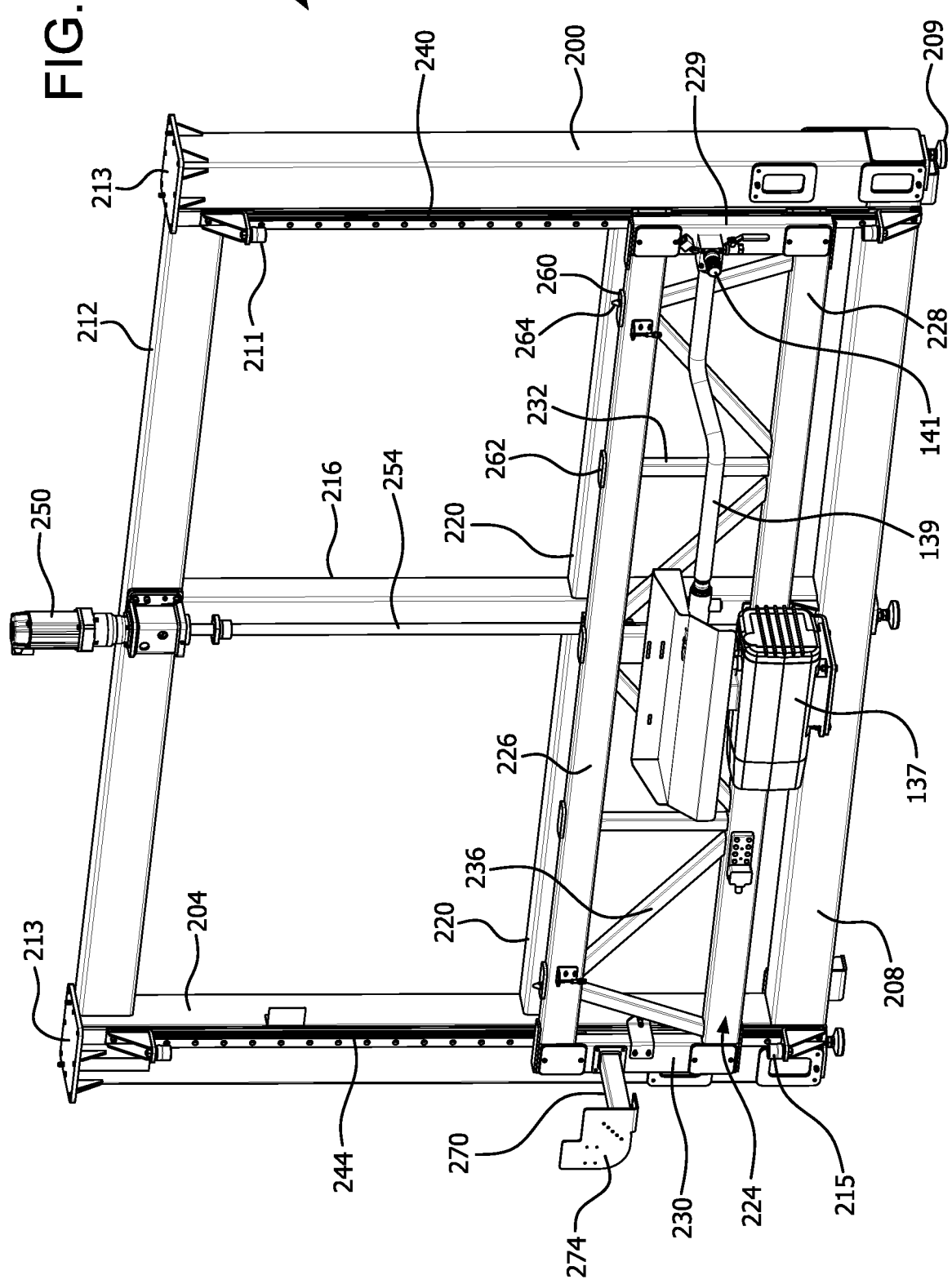
FIG. 20 is a perspective view of a right side end assembly of a disassembled build housing.

The platens 70 can be held in place by any suitable means. As shown in FIG. 9, the build support 50 can have braces 110 for physically supporting the platens 70. The build support 50 can have vacuum supplied by a vacuum conduit 135 which can have a plurality of vacuum valves 90 communicating therewith. The valves can have fittings 94 and control handles 98 which can be electromechanical and controlled by a processor if desired. The valve fittings 94 communicate as by conduits 120 with fitting 124 communicating to vacuum ports 128. Cups 132 can be provided to support and seal with the platens 70 resting on the build support 50. The platens have apertures 136 (FIG. 10) to transfer the vacuum to the object resting on the platens 70, whether the build item itself or a build sheet 71 on which the build item is printed. The vacuum conduit 135 can communicate with a fitting 134 which can be connected to a suitable vacuum source such as a vacuum pump 137 (FIG. 20). Sensors 113 can be provided on the build support 50 for purposes of fast object location, data acquisition, and tracking for the build process. A communications connection 115 can be provided and can be wired or wireless to communicate with a suitable processor (FIG. 13). The build support can also have transport enclosure 100 and 104 for engaging a transport device, for example the forks of a fork lift. Sensors 117 can also be provided on the platens 70 for purposes of alignment, data acquisition and tracking. A communications connection 119 can be provided for and can be wired or wireless to communicate with a suitable processor.

Figure 11:
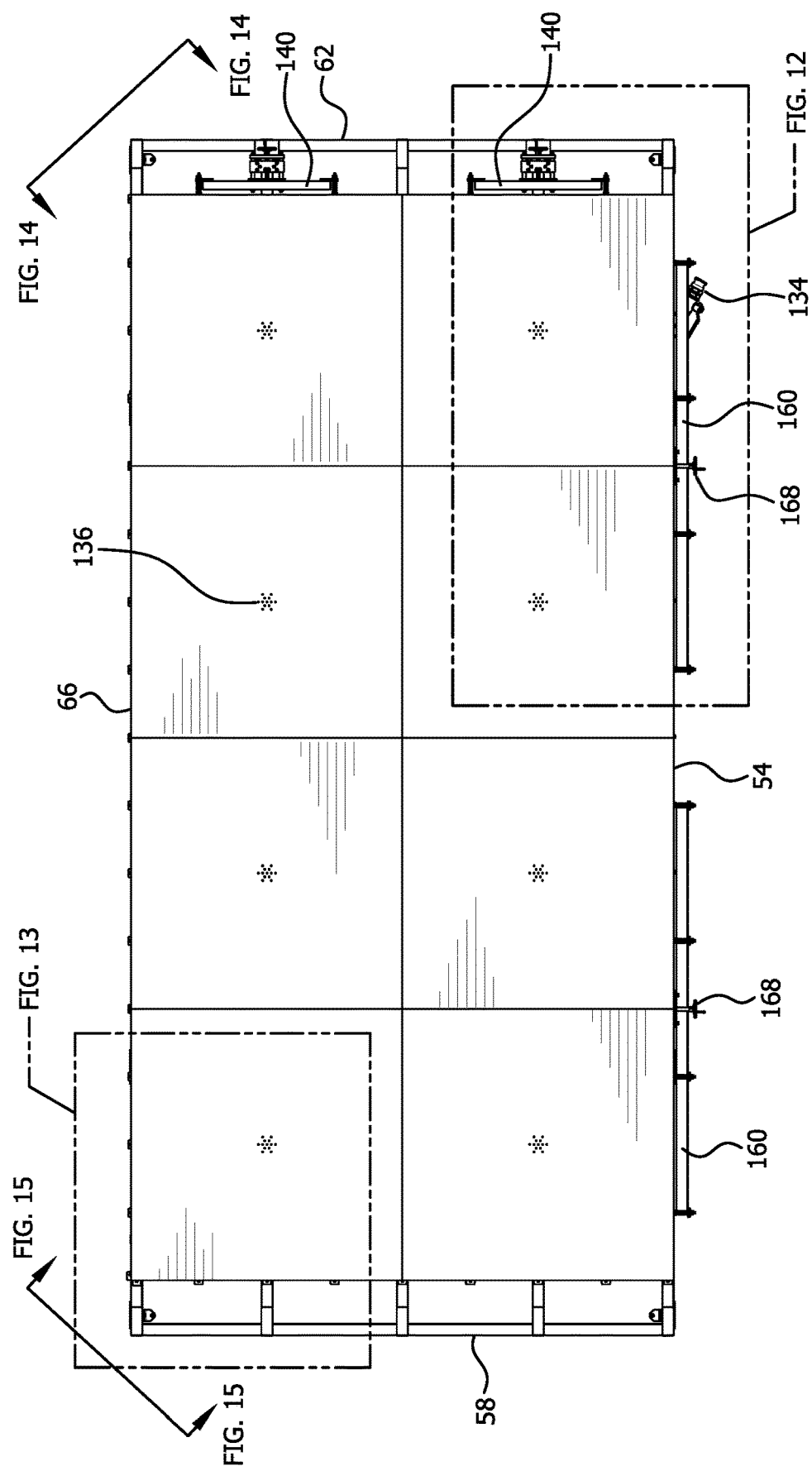
FIG. 11 is a plan view of a build platform with platens in place.
Figure 12:
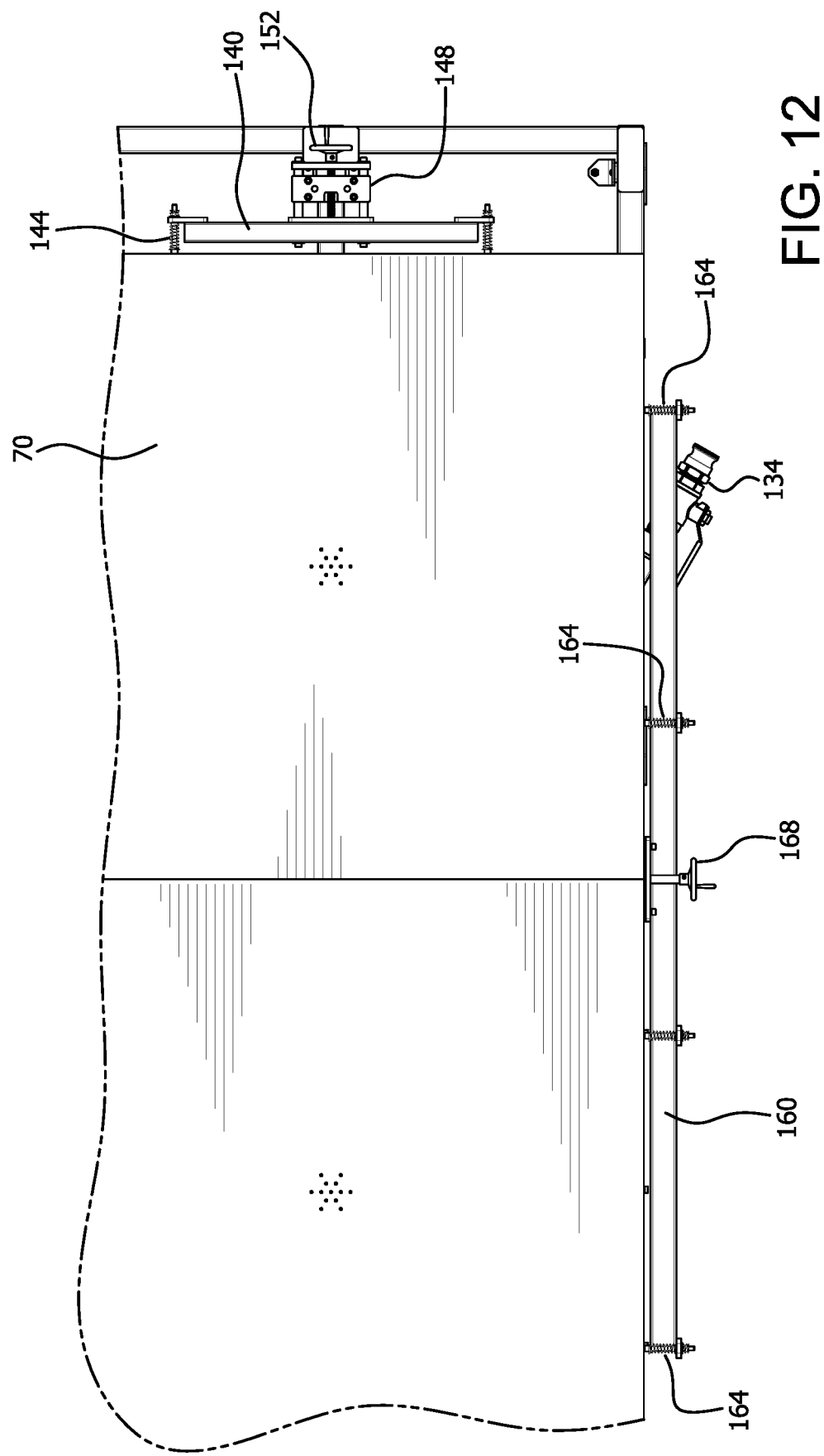
FIG. 12 is a magnified view of area FIG. 12 in FIG. 11.
Figure 14:
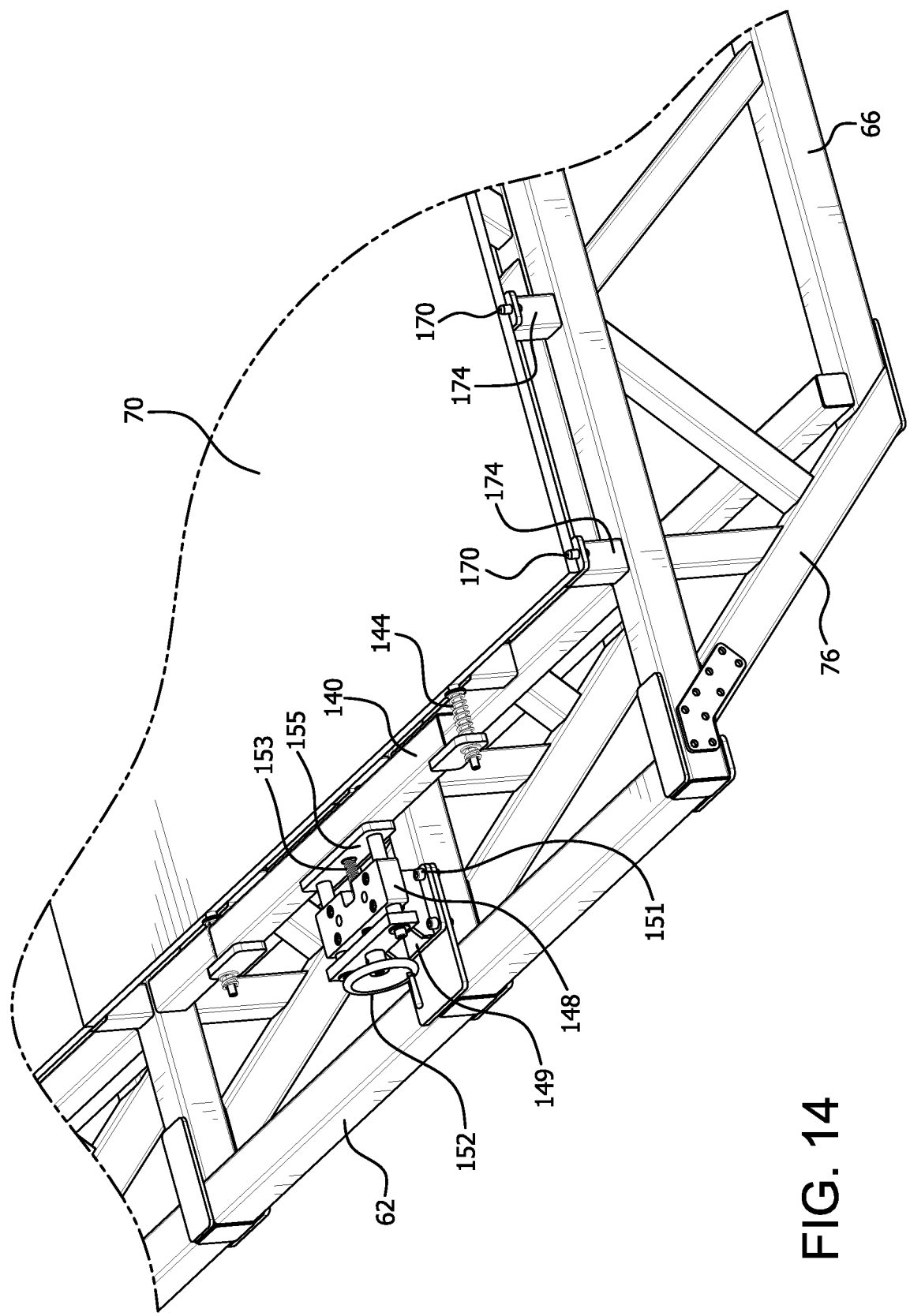
FIG. 14 is a perspective view of the build platform of FIG. 11 from the perspective of line FIG. 14-FIG. 14 in FIG. 11.

The build support 50 can also include one or more clamp structure for aligning the platens 70. Clamp jaws 140 can be provided on one or both of the left and right sides of the build support 50, and clamps jaws 160 can be provided at the front or rear of the build support 50 (FIG. 11). The clamp jaw 140 can have spring stops 144 for engaging the platens 70 (FIG. 12). The clamp assembly can also have a threaded rod 153 extending through a threaded rod guide 148 that is connected to the build support 50 through a base 149 by suitable structure such as threaded nuts 151 (FIG. 14). The threaded rod 153 can be connected to a plate 155 that is secured to the clamp jaw 140. Suitable structure such as a wheel 152 or an electromechanical device can be used to rotate the threaded rod to adjust the position of the clamp 140 and thereby the platen 70. The clamp jaw 160 can have a similar construction and can be operated by wheel 168 and can have spring-biased stops 164 mounted on plates 166. Upwardly directed pins 170 or other engagement structure can be provided on protrusions 174 and used to further position the platens 70 under the influence of the clamps 140 and 160 (FIG. 15).

Figure 23:
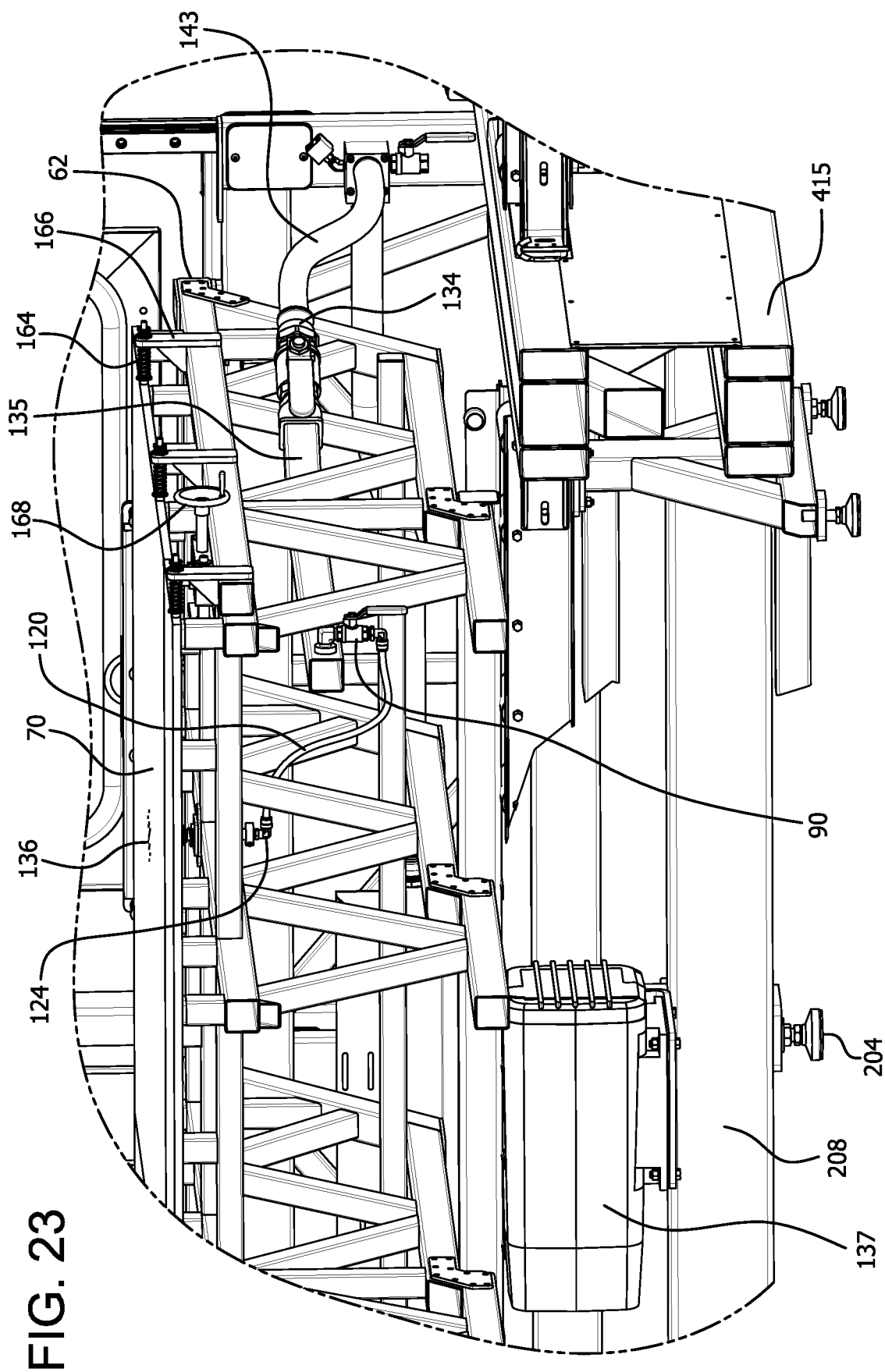
FIG. 23 is a magnified view of area FIG. 23 in FIG. 22.

The build housing 14 can be constructed according to many different designs. There is shown in FIG. 20 a right side end 40 of one design. Other designs are possible. A post 200 and a post 204 form the sides. A bottom member 208 and a top member 212 are joined to the posts 200 and 204 by suitable structure such as brackets 213. A center post 216 and a cross post 220 can be provided. A lifting member 224 such as a gate can include a top rail 226, a bottom rail 228, sides 229 and 230, vertical supports 232 and bracing 236. Tracks 240 and 244 on the posts 200 and 204 can be provided to slidably engage and guide the lifting member 224 as it is raised and lowered. Registration members 260 are provided at the top rail 226 and have engagement projections 264. Engagement pads 262 are also provided for engaging the build support 50. A motor 250 can be provided to drive a threaded rod 254 which can cooperate with a threaded fitting on the lifting member 224 to raise and lower the lifting member 224 upon operation of the motor 250. A bracket 270 can have a mounting surface 274 for routing control cables and wires. Stops 211 at the top of track 240 and 244 and stops 215 at the bottom of tracks 240 and 244 are provided to cushion contact with the lifting member 224. A vacuum connection 141 communicates by conduit 139 to vacuum pump 137. A conduit 143 can be provided to connect to the vacuum fitting 134 (FIG. 23). Adjustable feet 209 can also be provided for levelling.

Figure 21:
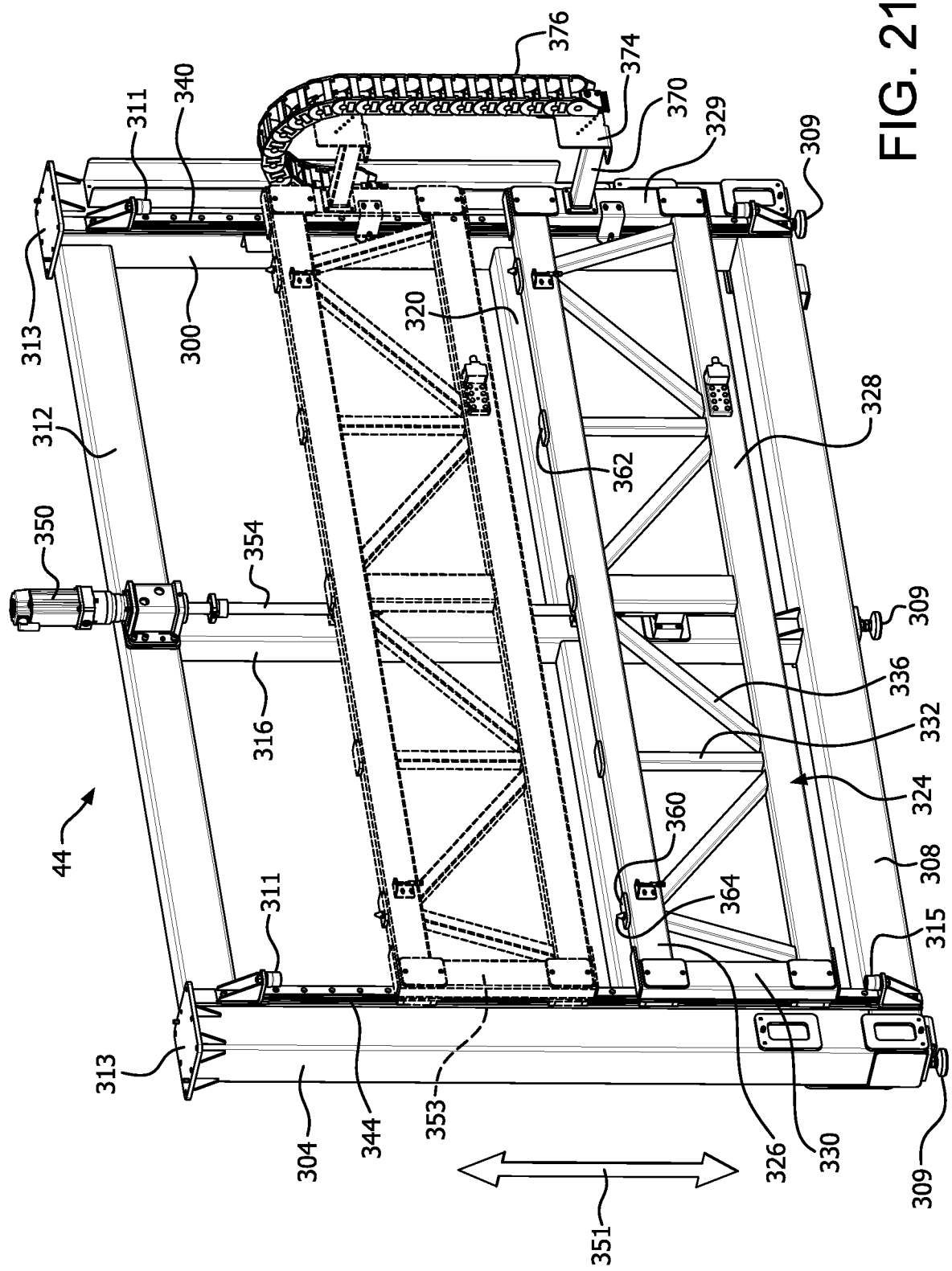
FIG. 21 is a perspective view of a left side and assembly of a disassembled build housing.
Figure 22:
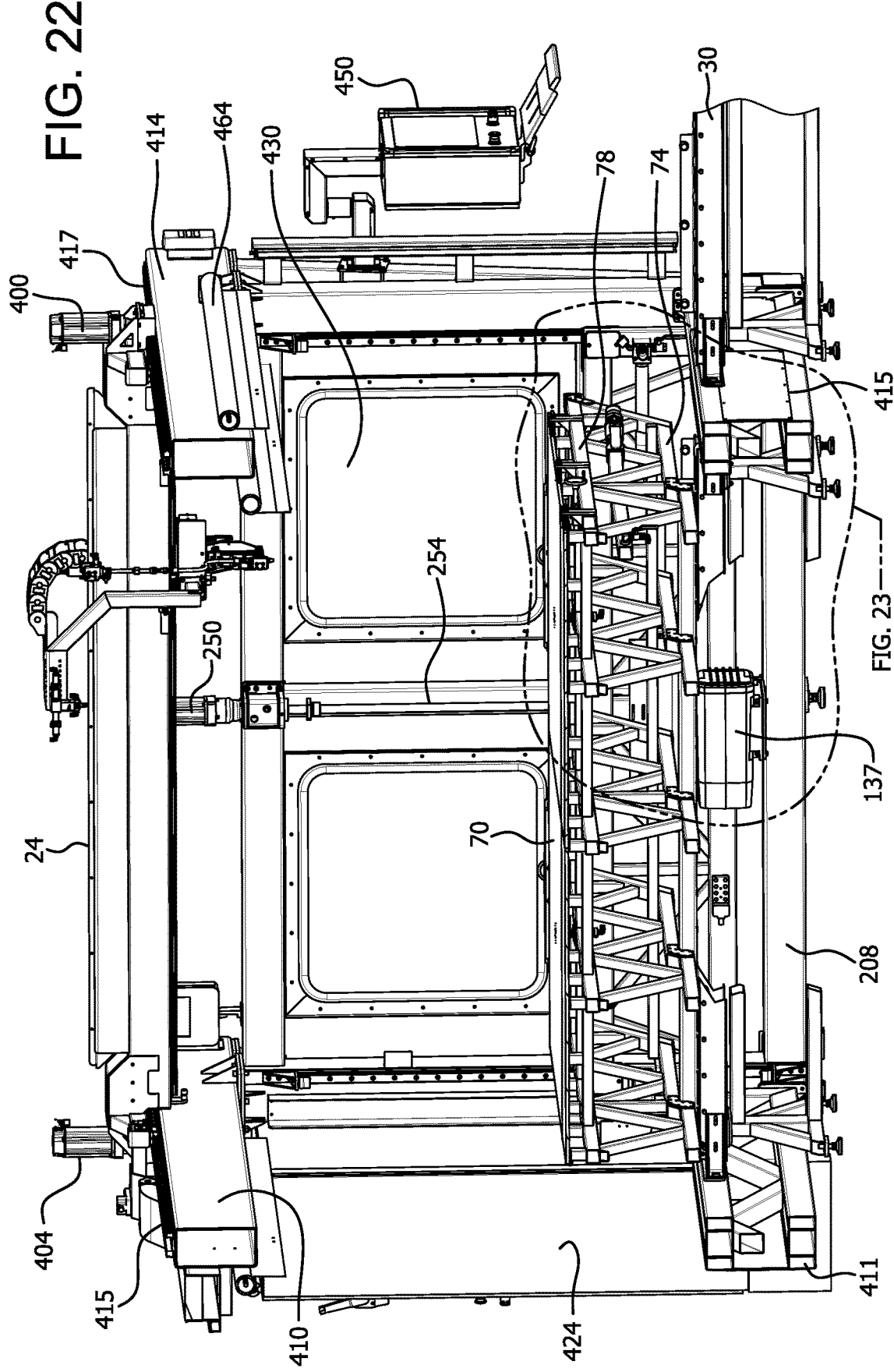
FIG. 22 is a cross section of an assembly for additive manufacturing taken from line FIG. 22-FIG. 22 in FIG. 1.

There is shown in FIG. 21 a left side end 44 of one design. Other designs are possible. A post 300 and a post 304 form the sides. A bottom member 308 and a top member 312 are joined to the posts 300 and 304 by suitable structure such as brackets 313. A center post 316 and a cross post 320 can be provided. A lifting member 324 such as a gate can include a top rail 326, a bottom rail 328, sides 329 and 330, and vertical supports 332 and bracing 336. Tracks 340 and 344 on the posts 300 and 304 can be provided to slidably engage and guide the lifting member 324 as it is raised and lowered. Registration members 360 are provided at the top rail 326 and have engagement projections 364. Engagement pads 362 are also provided for engaging the build support 50. A motor 350 can be provided to drive a threaded rod 354 which can cooperate with a threaded fitting on the lifting member 324 to raise and lower the lifting member 324 upon operation of the motor 350, as indicated by arrow 351 to a raised position shown in dotted lines as 353. Stops 311 at the top of track 340 and 344 and stops 315 at the bottom of tracks 340 and 344 are provided to cushion contact with the lifting member 324. A bracket 370 can have a mounting surface 374 for routing control cables and wires 376. Adjustable feet 309 can also be provided for levelling.

Figure 25:
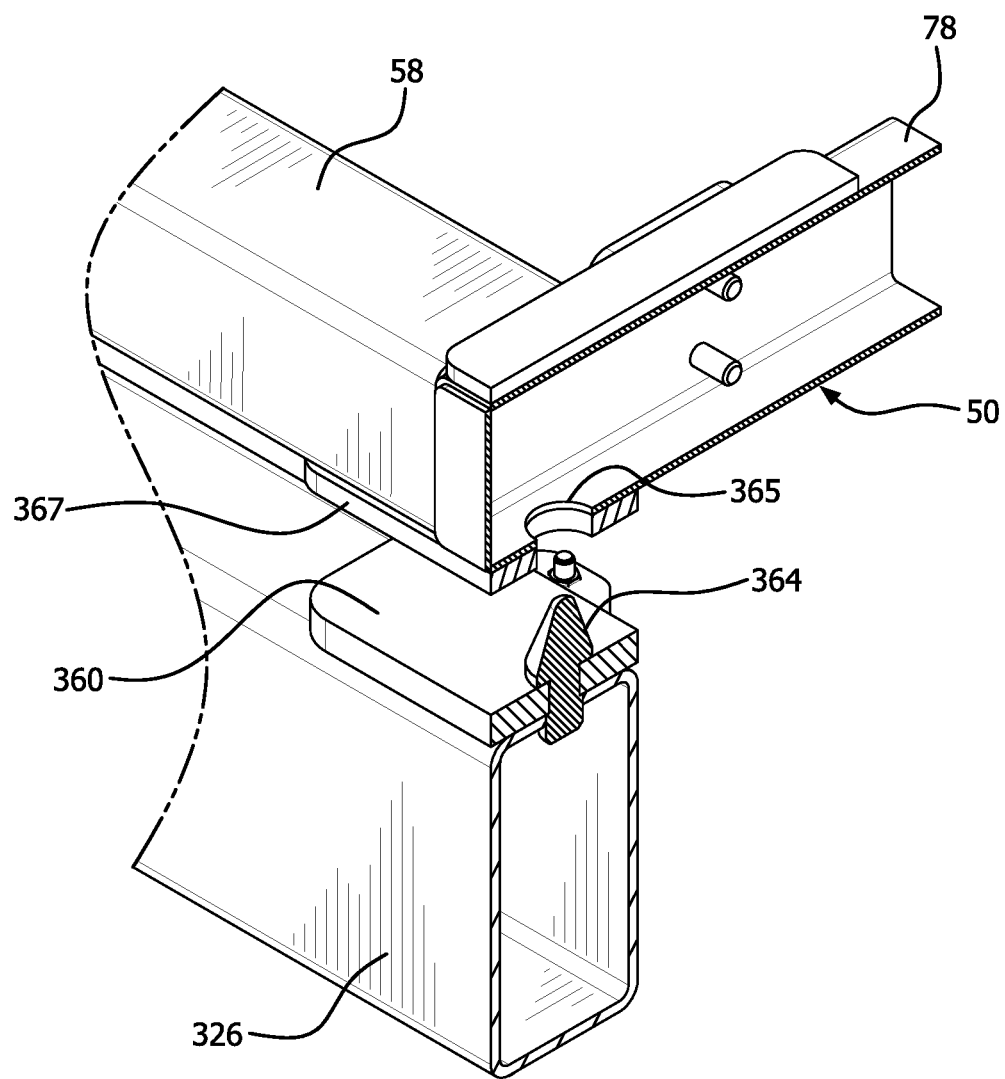
FIG. 25 is an exploded view, partially in cross-section, of cooperating registration pins and apertures on the build support and the lifting frame.
Figure 26:
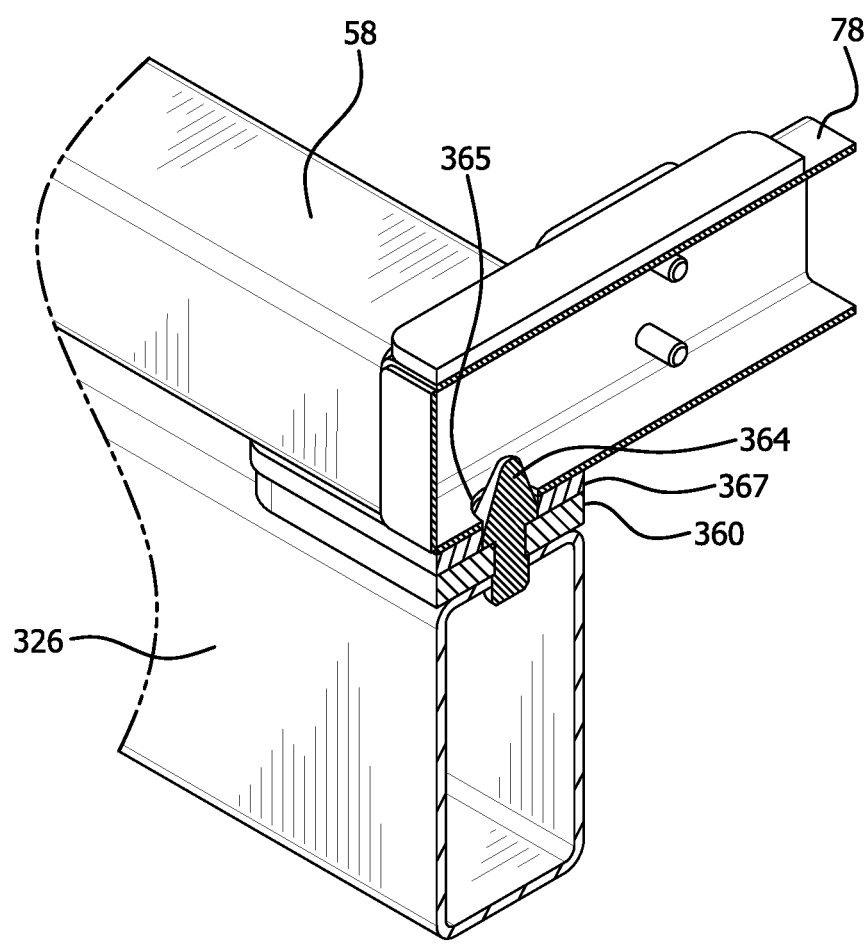
FIG. 26 is an assembled view, partially in cross-section, of cooperating registration pins and apertures on the build support and the lifting frame from area FIG. 25 in FIG. 1.

The manner in which the position of the build platform 18 in the build housing 14 is registered can vary. There is shown in FIG. 25 an exploded view, partially in cross section, of a projection 364 on top rail 326. A corresponding aperture 365 is provided on the build support 50. An engagement pad 367 can also be provided. Such projections can be provided in a plurality of positions, such as four locations shown in FIGS. 20-21. More or fewer sets of projections and apertures can be provided. Also, different mechanism for registering the position of the build platform 18 in the build housing 14 are possible. When aligned and lowered, the projections 364 enter the apertures 365 such that the position of the build support 50 relative to the housing 14 is known (FIG. 26).

Figure 24:
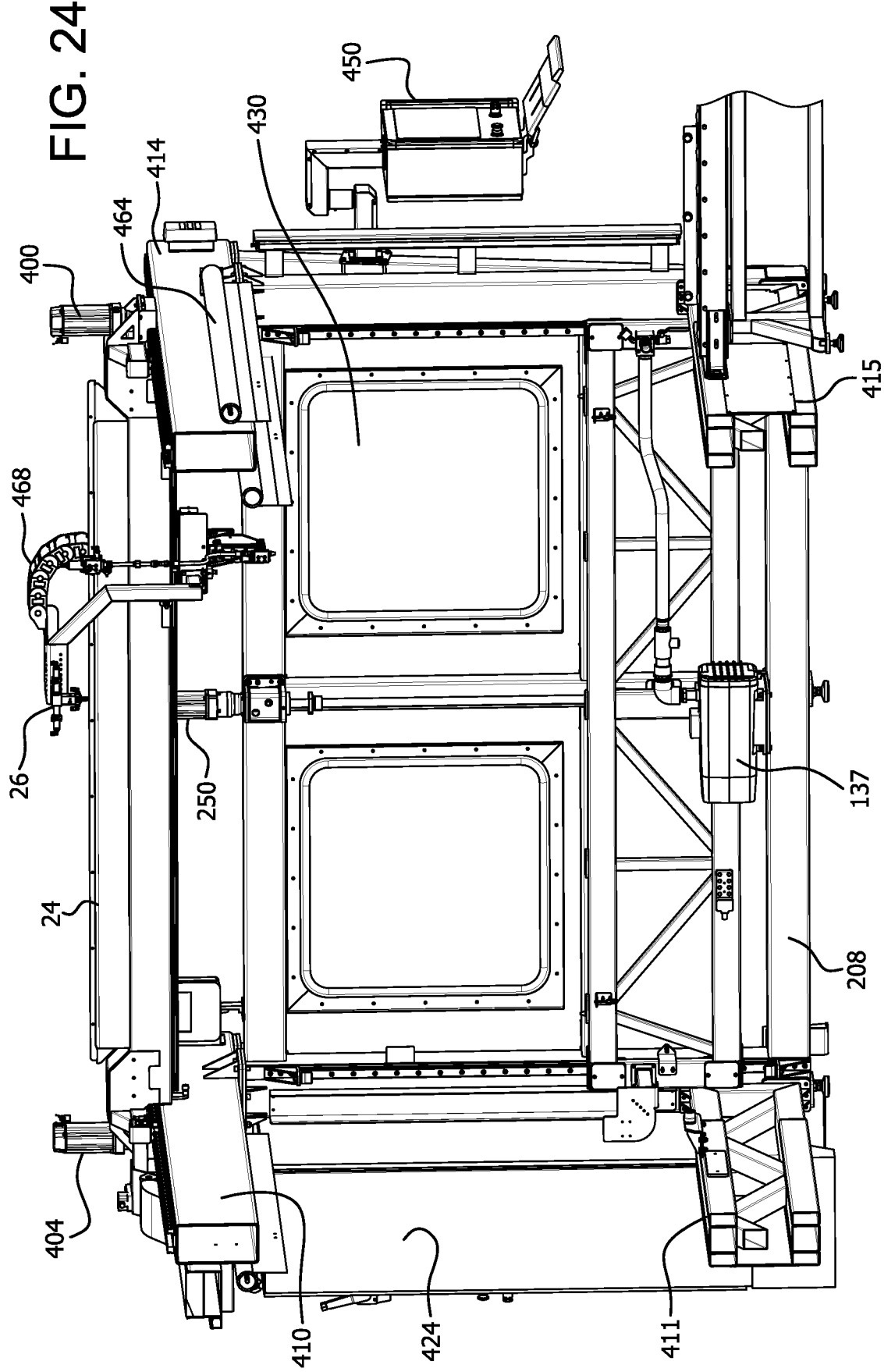
FIG. 24 is the cross-section of FIG. 22 with the build platform removed.

The build housing 14 can include a base 16 comprised of structural members such as rear structural members 411 and front structural members 415 (FIG. 4). The upper part of the build housing 14 can consist of rear structural member 410 and front structural member 414. These structural members are supported by the right side end 40 and the left side end 44. The rear structural member 410 can have a track 415 for engaging and guiding movement of the gantry 24. The front structural member can have a similar track 417 for the gantry 24. Motors 400 and 404 can be provided for movement of the gantry 24 (FIG. 23). Curtains 424, 430 and 464 or other protective shields can be provided to keep out dust and to contain volatiles (FIG. 24).

A processor 450 can be provided to control process operation. Processors for controlling additive manufacturing operations are well known and any suitable such processor and programming can be utilized. The processor controls the lifting and lowering of the build platform 18, and controls the operation of the gantry 24 and print head 26. Additionally, where multiple build platforms are used to print and process multiple build items, the processor can record the status and location of a particular build item and build platform. This allows continued use of the printer for other build projects while a printed item is undergoing further operations such as CNC machining.

Figure 27:
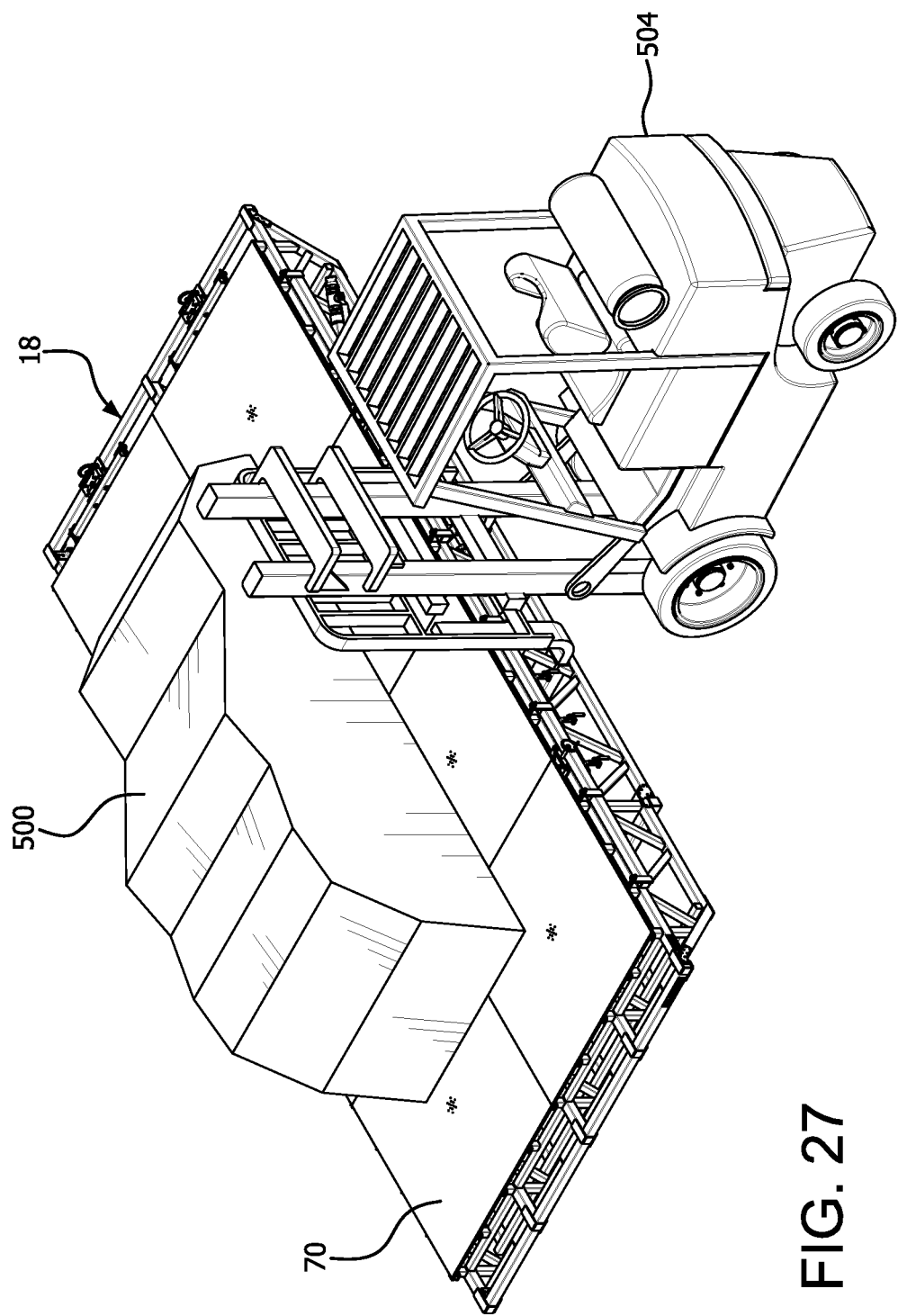
FIG. 27 is a perspective view of a build platform with a build piece and a transport device.
Figure 28:
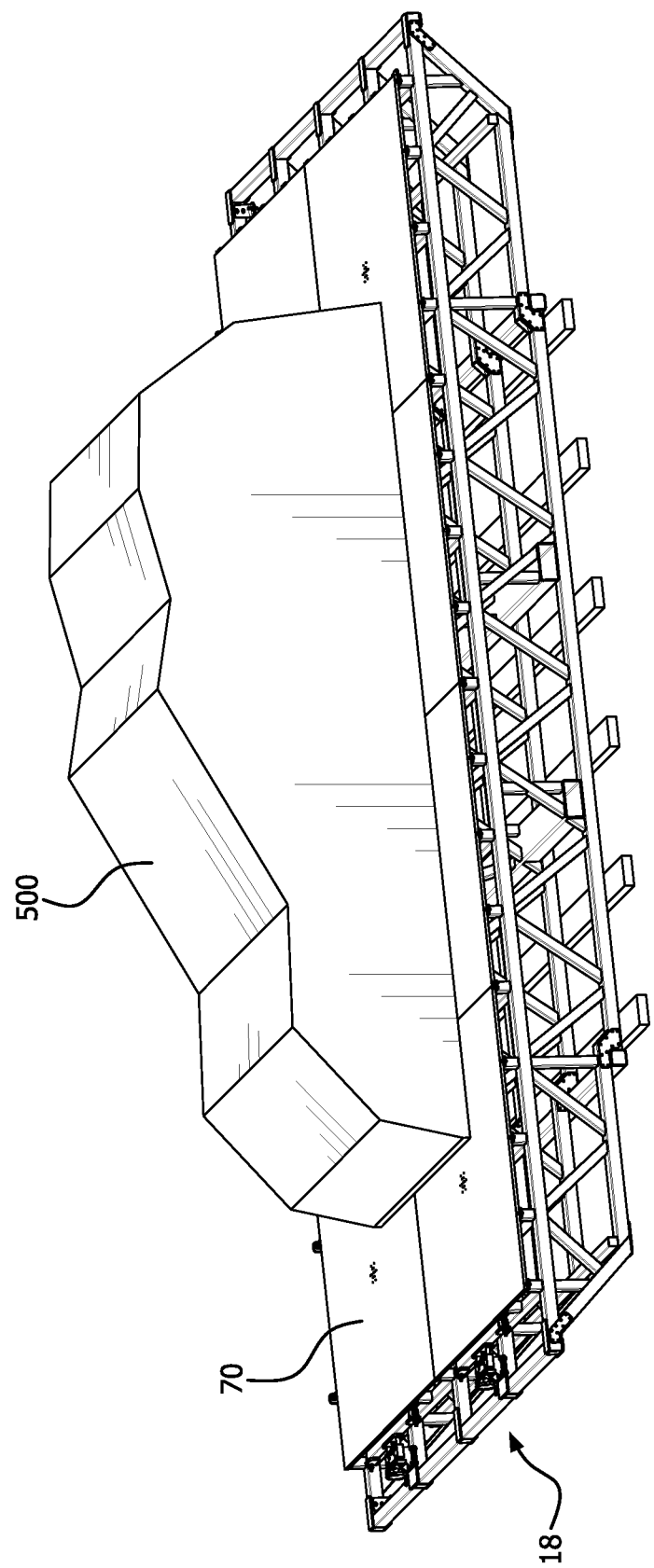
FIG. 28 is a perspective view of a build platform with a build piece in a cooling or curing step.

After the completion of printing, the build platform 18 containing the printed build item 500 can be removed (FIG. 27). The conveyors 30 can be used to move the build platform 18 into or out of the build housing 14. A transport device such as fork lift 504 can be used to engage the transport enclosure 100 and 104 such that the build platform and build item 500 and be lifted and moved. Although a fork lift 504 is shown, it will be appreciated that other transport devices such as robots could be utilized, and corresponding structure for engaging such devices to the build platform can be provided. Also, once removed, individual platen sheets 70 or build sheets can be removed with a fork lift, pallet stacker, robot or the like if the build item is confined to or supported by an individual platen 70 or build sheet. The build item 500 and build platform 18 can be set aside to cure and/or cool (FIG. 28). This is particularly the case with thermoset resins are used to print large build items, as substantial cooling is necessary prior to machining. This cooling can take place while another build platform 18 is placed into the build housing 14 to print another build item.

Figure 29:
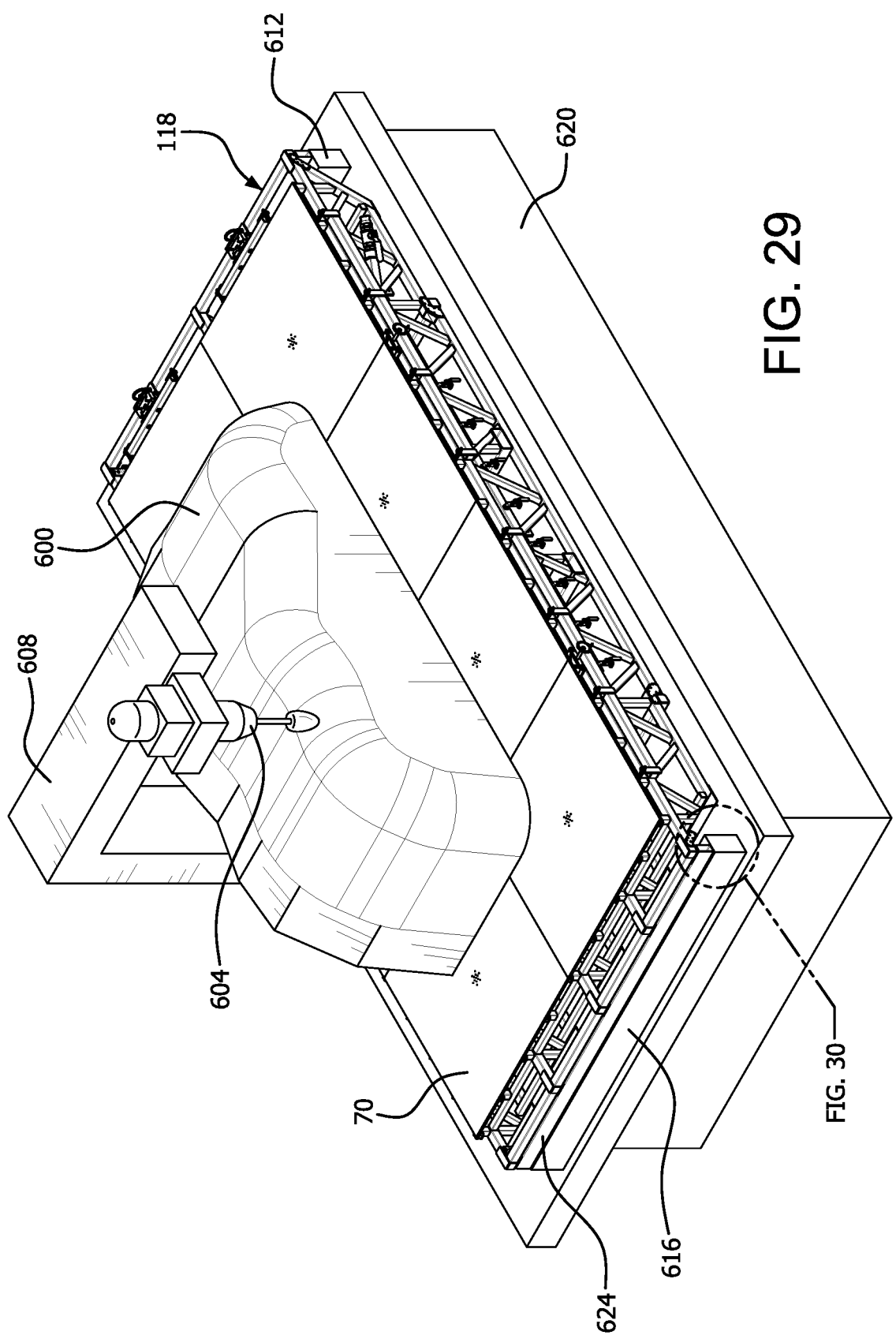
FIG. 29 is a perspective view of a build platform positioned with the build piece in a computer numerical control (CNC) machine.
Figure 30:
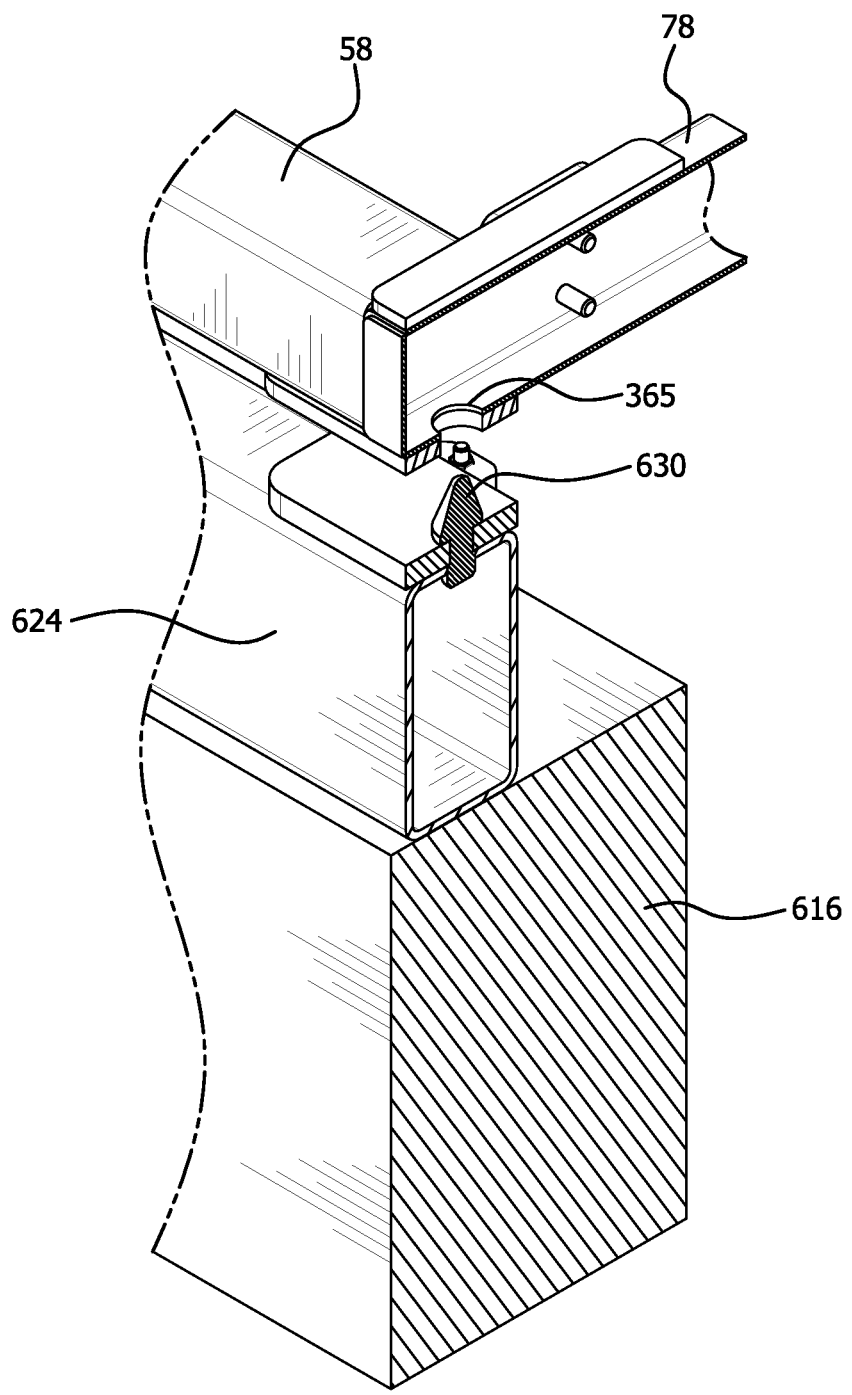
FIG. 30 is an exploded and magnified view of area FIG. 30 in FIG. 29.

There are often post-printing operations, particularly with large printed items. These can be CNC processes or other processes. There is shown in FIG. 29 a CNC milling machine 604 being used to produce a machined build item 600. The CNC machine is shown with a gantry 608 and a braces 612 and 616 for the build platform 18 and an engagement member 624 resting on a support 620. Many other CNC designs are possible. As shown in FIG. 30, the CNC machine can have registration structure that is similar to that found in the build housing 14, for example projections 630. The projections 630 are engaged to the apertures 365 of the build support 50 of the build platform 18. The position of the build support 50 and build item relative to the CNC or other machine is quickly determined, such that the post-processing operation can be quickly completed. A transport device such as fork lift 504 can then be used to transport the machined build item 600 to any other post-processing operation, where the same registration procedure can be used (FIG. 31).

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:
1. An assembly for additive manufacturing, comprising:
a build housing comprising a base, a print head, and a print head support connected to the base for supporting the print head above the base;
a driver system for moving the print head and the base relative to one another;
a build platform comprising a build support and at least one platen, the build support being detachably engageable to the housing, the build support comprising registration structure for registering the position of the build support relative to the build housing.
2. The assembly of claim 1, wherein the platen is detachably engageable to the build support.
3. The additive manufacturing assembly of claim 1, wherein the build housing further comprises a plurality of vacuum ports communicating with a vacuum supply conduit.

4. The additive manufacturing assembly of claim 3, wherein the at least one platen comprise vacuum passages, the vacuum passage of the at least one platen aligning with one of the vacuum ports to supply vacuum to a build item on the at least one platen.
5. The additive manufacturing assembly of claim 4, further comprising at least one valve for controlling vacuum to at least one vacuum port.
6. The additive manufacturing assembly of claim 1, wherein the build support comprises alignment structure for positioning the at least one platen.
7. The additive manufacturing assembly of claim 6, wherein the alignment structure comprises locating pins.
8. The additive manufacturing assembly of claim 1, wherein the build support comprises at least one clamp assembly comprising a movable jaw for engaging the platens.
9. The additive manufacturing assembly of claim 1, wherein the build housing further comprises a conveyor for moving the build support into and out of the build housing.
10. The additive manufacturing assembly of claim 9, wherein the conveyor comprises rollers.
11. The additive manufacturing assembly of claim 9, wherein the conveyor is movable relative to the base.
12. The additive manufacturing assembly of claim 1, wherein the driver system comprises a lifting member for engaging and lifting the build support, and a motor for moving the lifting member.
13. The additive manufacturing assembly of claim 12, wherein the lifting member comprises a lifting frame on opposing sides of the housing, each lifting frame comprising a lifting surface for engaging a cooperating surface on the build support such that lifting or lowering of the lifting frame will respectively lift and lower the build support, and a motor for lifting and lowering each lifting frame, the operation of each motor being controlled by a processor.
14. The additive manufacturing assembly of claim 13, wherein the registration structure comprises cooperating registration projections and apertures on the build support and the lifting frame.
15. The additive manufacturing assembly of claim 1, wherein the build support comprises a transport connector for connecting a transport device to the build support.
16. The additive manufacturing device of claim 15, wherein the transport connector comprises structure for engaging the fork of a fork lift.
17. The additive manufacturing assembly of claim 16, wherein the structure for engaging the fork of a fork lift comprises open-ended elongated parallel enclosures attached to the build support and dimensioned to receive the forks of the forklift.
18. The additive manufacturing assembly of claim 1, wherein the at least one platen includes having a plurality of platens, and the plurality of platens are positioned on the build support.
19. The additive manufacturing assembly of claim 1, further comprising at least one processor for controlling at least one selected from the group consisting of the operation of the print head and the driver system, tracking of a build platform, and tracking of a build item.
20. The additive manufacturing assembly of claim 1, wherein the print head support assembly is a gantry.
21. The additive manufacturing assembly of claim 1, further comprising sensors on at least one selected from the group consisting of the build housing, the build support, and the at least one platen for data acquisition and location tracking.

22. A method of additive manufacturing, comprising the steps of:
provanding a build housing comprising a base, a print head, and a print head support connected to the base for supporting the print head above the base, and a driver system for moving the print head and the base relative to one another;
providing a build platform comprising a build support and at least one platen, the build support being detachably engageable to the base of the build housing;
positioning the build support and at least one platen into the build housing;
registering the position of the build support relative to the housing;
operating the print head and the driver system to print a build item disposed on at least one platen;
disengaging the build support and removing the build support and the printed build item from the housing.

23. The method of claim 22, wherein the platen is detachably engageable to the build support, and further comprising the step of placing and aligning the at least one platen on the build support.

24. The method of claim 22, further comprising the step of allowing the build item to cool after removal of the build support and the build item from the build housing.

25. The method of claim 22, wherein after removing the build support and the build item from the build housing, the build support and the build item are placed in a computer numerical control (CNC) machine, and the position of the build support and the build item is registered in the CNC machine.

26. The method of claim 25, wherein the CNC machine comprises at least one selected from the group consisting of a milling machine, a lathe, a router, a grinder, a laser cutter, a water jet cutter, a stamping machine, or a robotic machine.

27. The method of claim 22, wherein the additive manufacturing is with a thermoset resin.

28. The method of claim 22, wherein the driver system comprises a lifting member for engaging and lifting the build support, and a motor for moving the lifting member, the method further comprising the step of operating the driver system to lift and lower the build support relative to the print head.

29. The method of claim 22, wherein the registration step comprises engaging cooperating registration projections and apertures on the build housing and the build support.

30. The method of claim 22, further comprising a step of providing sensors on at least one selected from the group consisting of the build housing, the build support, and the platens and using the sensors for data acquisition and location tracking.

* * * * *